US012782702B2

(12) United States Patent
Harke et al.

(10) Patent No.: US 12,782,702 B2
(45) Date of Patent: Nov. 3, 2026

(54) FOCUSING DEVICE, FOCUSING SYSTEM, MICROSCOPE AND METHOD FOR IMAGING AND/OR LOCALIZING MOLECULES OR PARTICLES IN A SAMPLE

(71) Applicant: ABBERIOR INSTRUMENTS GMBH, Gottingen (DE)

(72) Inventors: Benjamin Harke, Gottingen (DE); Haugen Mittelstadt, Bovenden (DE)

(73) Assignee: ABBERIOR INSTRUMENTS GMBH, Gottingen (DE)

(*) Notice: Subject to any disclaimer, the term of this patent is extended or adjusted under 35 U.S.C. 154(b) by 282 days.

(21) Appl. No.: 18/627,052

(22) Filed: Apr. 4, 2024

(65) Prior Publication Data

US 2024/0264420 A1 Aug. 8, 2024

Related U.S. Application Data

(63) Continuation-in-part of application No. PCT/EP2022/078441, filed on Oct. 12, 2022.

(30) Foreign Application Priority Data

Oct. 13, 2021 (EP) .................................... 21202354

(51) Int. Cl.
*G02B 21/00* (2006.01)
*G02B 21/36* (2006.01)

(52) U.S. Cl.
CPC ..... *G02B 21/0068* (2013.01); *G02B 21/0032* (2013.01); *G02B 21/006* (2013.01); *G02B 21/0092* (2013.01); *G02B 21/361* (2013.01)

(58) Field of Classification Search
CPC ............ G02B 21/0068; G02B 21/0032; G02B 21/006; G02B 21/0092; G02B 21/361;
(Continued)

(56) References Cited

U.S. PATENT DOCUMENTS

| | | | |
|---|---|---|---|
| 6,031,658 | A | 2/2000 | Riza |
| 2013/0083386 | A1 | 4/2013 | Harding et al. |

(Continued)

FOREIGN PATENT DOCUMENTS

| | | | |
|---|---|---|---|
| CN | 111879234 | B | 11/2021 |
| DE | 10 2014 113 716 | A1 | 3/2016 |

(Continued)

OTHER PUBLICATIONS

European Examination Report for Application No. 22798356.6 dated Aug. 20, 2025.

(Continued)

*Primary Examiner* — Arnel C Lavarias
(74) *Attorney, Agent, or Firm* — MOSER TABOADA

(57) ABSTRACT

A focusing device for a microscope includes a first polarization switching element configured to rotate a polarization of a linearly polarized light beam around a first optical axis from a first polarization direction to a second polarization direction upon receiving a switching signal, and a focusing element configured to axially displace a main focus of the light beam generated by a microscope objective lens between a first axial position and a second axial position dependent on the polarization of the light beam. Further, a focusing system includes at least two of the focusing devices, a microscope using the focusing device and a method for imaging and/or localizing molecules or particles in a sample.

11 Claims, 9 Drawing Sheets

(58) Field of Classification Search
CPC .. G02B 21/00; G02B 21/0004; G02B 21/002; G02B 21/0076; G02B 21/06; G02B 21/24; G02B 21/241; G02B 21/36
USPC ....... 359/386, 362, 363, 368, 369, 385, 388, 359/434
See application file for complete search history.

(56) References Cited

U.S. PATENT DOCUMENTS

| | | | |
|---|---|---|---|
| 2017/0052508 A1 | 2/2017 | Brooker et al. | |
| 2017/0108684 A1 | 4/2017 | Fischer et al. | |
| 2017/0123197 A1 | 5/2017 | Reuss et al. | |
| 2020/0054485 A1* | 2/2020 | Knox | B23K 26/082 |
| 2020/0310094 A1 | 10/2020 | Engelhardt et al. | |
| 2021/0050703 A1 | 2/2021 | Zou et al. | |
| 2021/0165199 A1 | 6/2021 | Heine et al. | |
| 2021/0231991 A1 | 7/2021 | Tam et al. | |
| 2021/0247600 A1 | 8/2021 | Siebenmorgen et al. | |
| 2021/0263295 A1 | 8/2021 | Fiolka et al. | |
| 2022/0187584 A1 | 6/2022 | Ha et al. | |

FOREIGN PATENT DOCUMENTS

| | | | |
|---|---|---|---|
| DE | 102023102378 | A1 | 8/2024 |
| JP | S63311322 | A * | 12/1988 |
| JP | H10141914 | A | 5/1998 |
| JP | H 11 32251 | | 2/1999 |
| JP | 2011197609 | A | 10/2011 |
| JP | 2013/097132 | A | 5/2013 |
| JP | 2020030378 | A | 2/2020 |
| WO | WO 2019/115626 | A1 | 6/2019 |
| WO | WO 2020/198487 | A1 | 10/2020 |

OTHER PUBLICATIONS

Kaplan et al., 'Acousto-optic lens with very fast focus scanning', Optics Letters, Jul. 15, 2001, pp. 1078-1080, vol. 26, No. 14.

Mermillon-Blondin et al., 'High-speed varifocal imaging with a tunable acoustic gradient index of refraction lens' Optics Letters, Sep. 15, 2008, pp. 2146-2148. vol. 33, No. 18.

S. Hou et al., 'Real-time 3D single molecule tracking', Nature Communications, 2020, pp. 3607-3617, 17(11), https://doi.org/10.1038/s41467-020-17444-6 | www.nature.com/naturecommunications.

G. Konstantinou et al., 'Dynamic wavefront shaping with an acousto-optic lens for laser scanning microscopy', Optics Express, Mar. 21, 2016, pp. 6283-6299, vol. 24, No. 6, DOI: 10.1364/OE.24.006283.

F. Balzarotti et al., 'Nanometer resolution imaging and tracking of fluorescent molecules with minimal photon fluxes', arXiv: 1611.03401 [physics.optics], 85 pages, 2016.

K.C. Gwosch et al., 'MINFLUX nanoscopy delivers 3D multicolor nanometer resolution in cells', Nature Methods, 2020, pp. 217-224, 17 (2), https://doi.org/10.1038/s41592-019-0688-0.

R. Schmidt et al., 'MINFLUX nanometer-scale 3D imaging and microsecond-range on a common fluorescence microscope', Nature Communications, 2021, pp. 1478-1490, 12(1), https://doi.org/10.1038/s41467-021-21652-z, www.nature.com/naturecommunications.

C K Lee et al. , A head-mounted compressive three-dimensional display system with polarization-dependent focus switching, Proc. of SPIE, 2016, 7 pages, vol. 10022 10220D-1, doi: 10.1117/12.2247591.

M. Lenz et al.3-D stimulated emission depletion microscopy with programmable aberration correction, Journal of Biophotonics 7, 2014, pp. 29-36, No. 1-2, DOI 10.1002/jbio.201300041.

J Marquard, Digital light deflection and electro-optical laser scanning for STED nanoscopy, Dissertation, 2017, 79 pages.

T Deguchi et al., Fast and robust 3D MINFLUX excitation with a variable phase plate, bioRxiv, 2023, 18 pages, doi:10.1101/2023.10.31.564945.

M K Geismann et al., A Fast Interferometric Beam Shaper for Multi-Emitter 3D MINFLUX, bioRxiv, 2023, 22 pages, doi:10.1101/2023.12.09570565.

* cited by examiner

FOCUSING DEVICE, FOCUSING SYSTEM, MICROSCOPE AND METHOD FOR IMAGING AND/OR LOCALIZING MOLECULES OR PARTICLES IN A SAMPLE

CROSS-REFERENCE TO RELATED APPLICATIONS

The present application is a continuation-in-part application and claims priority to and the benefit of International Patent Application No. PCT/EP2022/078441, filed on Oct. 12, 2022, which claims priority to EP Patent Application No. 21202354.3 filed on Oct. 13, 2021. Each of these applications is incorporated herein by reference in their entirety.

TECHNICAL AREA

The present disclosure relates to a focusing device and a focusing system for a microscope, a microscope comprising the focusing device or the focusing system and a method for imaging and/or localizing molecules or particles in a sample.

A focusing device in the meaning used throughout this specification is a device for shifting a focus of a light beam along an optical axis, particularly an optical axis along which the light beam propagates. During use of the focusing device in a microscope, a light beam is focused by an objective lens of the microscope, and the position of the focus is shifted in the axial direction relative to a sample which is to be observed or analyzed by the microscope. By axially shifting the focus position, e.g., a focal plane in the sample may be shifted axially to observe or analyze different areas in the sample.

PRIOR ART

Various focusing devices for microscopes have been described in the prior art. In the simplest form, the objective or a sample carrier holding the sample is moved manually or by electrically driven actuators (e.g., motors or piezoelectric elements) to change the operating distance between the objective lens and the sample to change the focus position.

These types of focusing devices involve the mechanical movement of parts, which has the disadvantage that focusing speed is limited, and that inaccuracies may occur due to the inertia of the parts and due to resonance phenomena.

Electro-optic deflectors (EODs) and acousto optic deflectors (AODs)/acousto optic modulators (AOMs) which are frequently used as lateral scanning devices in the field of microscopy have also been used as axial focusing devices in the prior art.

In one implementation of an AOM-based lens linearly chirped signals are applied to two adjacent AOMs with opposite wave propagation directions to achieve fast axial scanning (A. Kaplan et al.: 'Acousto-optic lens with very fast focus scanning', Opt. Lett. 26 (14), 1078-1080, 2001).

Another type of acousto-optic varifocal lens, the so-called tunable-acoustic gradient (TAG) lens (A. Mermillon-Blondin et al.: 'High-speed varifocal imaging with a tunable acoustic gradient index of refraction lens': Opt. Lett. 33(18), 2146-2148 (2008); S. Hou et al.: 'Real-time 3D single molecule tracking', Nat. Comm. 17(11), 3607-3617 (2020)) consists of a cylindrical piezoelectric shell filled with a transparent material. By a sinusoidal driving signal in the radio frequency range, a periodic alteration of the refractive index of the transparent material can be achieved.

However, when using these setups, axial focus re-positioning is strictly periodic, which is not acceptable for certain microscopy applications, such as iterative MINFLUX microscopy (see below), where a beam must be steered according to patterns which are determined iteratively in real time.

Another approach uses non-linearly chirped acoustic signals in a similar configuration of AOMs to generate non-periodic axial scans (G. Konstantinou et al.: 'Dynamic wavefront shaping with an acousto-optic lens for laser scanning microscopy', Opt. Expr. 24 (6), 6283-6299 (2016)).

However, solutions involving AOMs are generally technically challenging, and expensive components are often involved. Moreover, beam displacement by AOMs is strongly wavelength dependent which is disadvantageous for multicolor applications.

Minimal emission flux, also referred to in scientific literature as maximally informative luminescence excitation probing, or by the acronym MINFLUX microscopy is a localization method for single fluorescent molecules achieving nanometer precision with minimal light exposure of the sample. In this technique, EODs are commonly used to laterally reposition an excitation light distribution with a central minimum (e.g., a so-called donut) relative to an expected location of the single fluorophore. The amount of detected fluorescent light for each location of the excitation light distribution can then be used to determine a new position estimate (see, e.g., Balzarotti F, Eilers Y, Gwosch K C, Gynnå, A, Westphal V, Stefani F, Elf J, Hell S W 'Nanometer resolution imaging and tracking of fluorescent molecules with minimal photon fluxes', arXiv:1611.03401 [physics.optics] (2016)). In this application, the small working range of EODs is acceptable, since additional scanning devices such as galvo scanners or piezoelectric stages can be used for coarse positioning of the excitation laser beam relative to the sample.

For 3D MINFLUX microscopy, highly accurate axial focus displacement on the nanometer scale is necessary in addition to lateral beam deflection. In one application (K. C. Gwosch et al.: 'MINFLUX nanoscopy delivers 3D multicolor nanometer resolution in cells', Nat. Methods 17(2), 217-224 (2020)), a varifocal lens based on an electro-optically driven KDP crystal has been used.

However, these varifocal lenses are easily damaged and extremely expensive, limiting their use in everyday practice.

Deformable mirrors have also been used as axial focusing devices, e.g., in 3D MINFLUX microscopy (R. Schmidt et al.: 'MINFLUX nanometer-scale 3D imaging and microsecond-range on a common fluorescence microscope', Nat. Commun. 12(1), 1478-1490 (2021)).

However, since beam deflection is achieved by mechanical deformation in these devices, axial scanning is still limited in speed. In addition, deformable mirrors are quite expensive.

Fast lateral scanning over a small working range can also be achieved by a combination of electrooptical polarization switches (such as Pockels cells) with polarizing beam splitters (PBS) or Nomarski prisms as described in WO 2019/115626 A1. Whereas a single unit can only deflect a beam between two distinct positions, several such units can be connected in series for stepwise displacement over a larger range. However, WO 2019/115626 A1 does not disclose or suggest how this concept could be applied to axial focusing.

A microscope using an approach termed 'remote focusing' is described in patent publication US 2021/0263295 A1: Lateral beam scanning by a galvanometric scanner is converted into axial focus shifts by an auxiliary objective reflecting the light beam on a stepped mirror or a tilted mirror arranged at the focus of the auxiliary objective and in a 4F Fourier optic arrangement relative to the galvanometric scanner. This method requires relatively bulky instrumentation and accurate alignment of the Fourier optics, limiting its usability.

Another scanner according to the prior art, which was designed to achieve a high scanning bandwidth, e.g., in fiberoptic switches, comprises a combination of polarization switches and birefringent crystals for lateral beam deflection (U.S. Pat. No. 6,031,658 A). Several individually switchable units based on this combination are arranged in series in a collimated beam path between two lenses to form the scanner. For 3D scanning liquid-crystal based varifocal lenses can be combined with the lateral deflection units. However, regarding axial scanning, this brings about the above-discussed disadvantages of known varifocal lenses.

OBJECTIVE

Thus, the objective underlying the present disclosure is to provide a focusing device for a microscope that allows accurate and fast axial scanning, particularly for MINFLUX microscopy, at affordable costs.

Solution

This objective is attained by the focusing device with the features of independent claims. The dependent claims relate to favorable embodiments of the focusing device and the microscope. The subject of the present disclosure is further described hereafter.

Description

A first aspect of the disclosure relates to a focusing device for a microscope comprising a first polarization switching element, particularly a Pockels cell, configured to rotate a polarization of a linearly polarized light beam around a first optical axis from a first polarization direction to a second polarization direction upon receiving a switching signal, wherein particularly the second polarization direction is perpendicular to the first polarization direction.

The focusing device further comprises a focusing element configured to axially displace a main focus of the light beam between a first axial position and a second axial position dependent on the polarization of the light beam, wherein the main focus is generated by a microscope objective lens.

In particular, the focusing device is configured to displace the main focus of the light beam exclusively axially. In other words, the focusing device is not configured to displace the main focus laterally, i.e., perpendicular to the optical axis.

In particular, the light beam is an illumination light beam configured to illuminate the sample. For example, the illumination light beam may be an excitation light beam configured to excite emitters (e.g. fluorophores, light reflecting or light scattering particles or the like) in the sample.

The inventors have realized that fast switching of an axial focus position of a microscope objective lens may be achieved by fast polarization switching combined with a polarization-dependent focusing element, particularly providing a polarization-dependent optical path length.

The focusing device according to the present disclosure uses relatively simple, robust and affordable components, in particular compared to certain focusing devices known from the prior art.

Furthermore, advantageously, focus positioning may be achieved purely by optical components without any mechanical displacement of parts, which avoids negative effects due to inertia and mechanical oscillations.

The focusing device according to the present disclosure is particularly advantageous for a 3D MINFLUX microscope. MINFLUX microscopy (a specific form of localization microscopy) is defined here as a method, in which singular emitters (e.g., fluorophores, nanoparticles or the like) are illuminated by an illumination light having an intensity distribution comprising a local intensity minimum, particularly an intensity zero, at a focus in the sample, wherein the local minimum is placed at illumination positions in a vicinity of a presumed position of a singular emitter, wherein light emissions of the singular emitter are recorded for the illumination positions, and wherein a position of the singular emitter is estimated from the illumination positions and the corresponding recorded light intensities. MINFLUX may be applied in particular for generating high resolution images or several localized emitters in the sample or tracking of single emitters.

In 3D MINFLUX using the focusing device according to the present disclosure, the local minimum is placed at illumination positions at different axial positions along an optical axis of the objective focusing the illumination light (that is different focal planes). For MINFLUX microscopy, due to the achievable super-resolution in the low nanometer range, the necessary displacement along the optical axis is small (typically on the order of tens to hundreds of nanometers) compared to conventional 3D microscopy (e.g., using confocal laser scanning microscopy). Therefore, the effect of aberrations that might be introduced due to the change in optical path length of the illumination light by the focusing device according to the present disclosure is typically much smaller than for conventional microscopy. In addition, if the local minimum of the intensity distribution is not severely affected by the aberrations, position estimation using a MINFLUX method may still be possible in contrast to conventional imaging.

Emitters are defined here as entities acting as point sources of light (e.g., fluorescence light or reflected illumination light) in the sample. These emitters are “singular” if they are optically separable. This may be the case if emitters in a bright state, in which they are emitting light, have a distance above the diffraction limit to neighboring emitters at the time of a measurement.

Emitters in a dark, non-emitting state may be arranged at shorter distances. Emitters of different emission spectra or lifetimes may also be separable, i.e., singular, if they can be distinguished by spectral separation or lifetime analysis, or the like.

In certain embodiments, the focusing device is configured to displace the main focus between exactly two positions in a stepwise or binary manner. Therein, displacement ‘in a binary manner’ means shifting the focus between two predefinable axial positions without any positions in between.

In certain embodiments, the polarization switching element comprises a switching rate of at least 2 kHz (in other words a minimum switching time interval of 500 μs or less), particularly at least 5 kHz (in other words a minimum switching time interval of 200 μs or less). In particular, the speed of focus shifting is determined by the speed of the polarization switching element, especially if no movement of parts is involved. Therefore, a switching rate of at least 2 kHz, particularly at least 5 kHz, offers a significant advantage for fast 3D scanning applications, such as 3D MINFLUX microscopy, where the excitation light distribution must be quickly re-positioned in a pre-defined 3D pattern around the expected location of the target molecule or particle. Whereas certain deformable mirrors, e.g., operate at maximum speeds of about 2 kHz, typical Pockels cells features switching rates of up to 5 kHz.

In certain embodiments, the polarization switching element and/or the second polarization switching element comprises a switching rate of at least 0.1 kHz, at least 0.2 kHz, at least 0.3 kHz, at least 0.4 kHz, at least 0.5 kHz, at least 0.6 kHz, at least 0.7 kHz, at least 0.8 kHz, at least 0.9 kHz, at least 1 kHz, at least 1.1 kHz, at least 1.2 kHz, at least 1.3 kHz, at least 1.4 kHz, at least 1.5 kHz, at least 1.6 kHz, at least 1.7 kHz, at least 1.8 kHz, at least 1.9 kHz, at least 2 kHz, at least 2.1 kHz, at least 2.2 kHz, at least 2.3 kHz, at least 2.4 kHz, at least 2.5 kHz, at least 2.6 kHz, at least 2.7 kHz, at least 2.8 kHz, at least 2.9 kHz, at least 3 kHz, at least 3.1 kHz, at least 3.2 kHz, at least 3.3 kHz, at least 3.4 kHz, at least 3.5 kHz, at least 3.6 kHz, at least 3.7 kHz, at least 3.8 kHz, at least 3.9 kHz, at least 4 kHz, at least 4.1 kHz, at least 4.2 kHz, at least 4.3 kHz, at least 4.4 kHz, at least 4.5 kHz, at least 4.6 kHz, at least 4.7 kHz, at least 4.8 kHz, at least 4.9 kHz, or at least 5 kHz.

In certain embodiments, the first polarization switching element (and optionally also the second polarization switching element described below) comprises an electrooptic switching element, particularly a Pockels cell.

In certain embodiments, the first polarization switching element comprises at least one acousto-optic modulator (AOM). In certain embodiments, the first polarization switching element comprises a first acousto-optic modulator configured to modulate an intensity of a first linearly polarized light beam having a first polarization direction, a second acousto-optic modulator configured to modulate an intensity of a second light beam having a second polarization direction perpendicular to the first polarization direction, and a control device configured to control the first acousto-optic modulator and the second acousto-optic modulator to switch between the first light beam and the second light beam. For example, switching between the beams may comprise switching between a first state, in which the first AOM completely blocks the first light beam (and the second AOM may particularly leave the intensity of the second light beam unaffected), and a second state, in which the second AOM completely blocks the second light beam (while the first AOM may particularly leave the intensity of the first light beam unaffected). Compared to switching with an electrooptic element such as a Pockels cell, this embodiment may be more robust and economically feasible.

In certain embodiments, the focusing device comprises a polarizing beam splitter (PBS) configured to split an (unpolarized) incoming light beam into the first linearly polarized light beam having the first polarization direction and the second linearly polarized light beam having the second polarization direction perpendicular to the first polarization direction. In particular, the incoming light beam may be a laser beam generated by a laser source. The first and the second light beam may then be guided in parallel beam paths, in which the first AOM and the second AOM are arranged to switch between the first light beam and the second light beam.

In certain embodiments, the focusing device comprises a beam combiner, particularly a polarizing beam combiner, configured to combine the first light beam and the second light beam after being modulated by the first AOM and/or the second AOM. In this manner, the first and/or the second light beam (depending on the switching mode) can be coupled into a common beam path.

In certain embodiments, the focusing device comprises a fiber coupler configured to couple the first light beam and/or the second light beam (depending on the switching mode) into an optical fiber.

In certain embodiments, the first polarization switching element comprises a first electrooptical modulator (EOM). In particular, a modulation axis of the first electrooptical modulator is arranged at an angle of 45° with respect to a polarization direction of the linearly polarized light beam, such that a phase shift between a first polarization component and a second polarization component of the light beam is caused, wherein the first polarization component and the second polarization component comprise orthogonal polarization directions. By controlling a voltage of the first EOM, the amount of the phase shift (i.e., the phase angle by which the components are shifted) may be controlled.

In certain embodiments, the first polarization switching element comprises a first EOM and a polarization rotator, particularly a quarter wave plate, arranged in a light path downstream of the first EOM. In particular, a modulation axis of the first EOM is arranged at an angle of 45° with respect to a polarization direction of the linearly polarized light beam, and a principal axis of the polarization rotator is arranged parallel to the polarization direction of the light beam (i.e., at an angle of 45° with respect to the modulation axis of the first EOM). In this manner, a light beam with two orthogonal polarization components may be generated, wherein the relative amplitude of the components may be controlled by controlling the voltage of the first EOM.

In certain embodiments, the first polarization switching element further comprises a second electrooptical modulator (EOM) comprising a modulation axis which is parallel to the (initial) polarization direction of the light beam. By controlling the voltage of the second EOM, the relative phase of the two components of the light beam may be controlled.

Using the different configurations of the EOM(s) described above, the modulated light beam comprising the phase- and/or amplitude shifted orthogonally polarized components may be used, for example to modulate the spatial phase and/or amplitude distribution of the two components differently, e.g., with a wavefront modulator, such as a spatial light modulator (SLM), to adjust an axial position of a focus of the light beam (see below). In certain embodiments, the focusing element comprises or is a birefringent focusing element. The birefringent element comprises a first refractive index for light having the first polarization direction and a second refractive index which is different from the first refractive index for light having the second polarization direction (e.g., by at least 10%). Due to the different refractive indexes, the optical path length of the light beam differs depending on its polarization, resulting in two different axial positions of the main focus.

Advantageously, since the optical path length is adjusted via the refractive index of the birefringent element according to this embodiment, no additional alignment of separate geometric light paths is necessary.

In particular, an ordinary axis of the birefringent element is perpendicular to the first optical axis.

In certain embodiments, the focusing device comprises a first polarizing beam splitter configured to direct the light beam along a first light path and a second light path depending on the polarization of the light beam.

In certain embodiments, the focusing element is arranged in the first light path or the second light path. In particular, no focusing element is arranged in the other (second or first) light path.

In certain embodiments, the focusing device comprises a first focusing element arranged in the first light path and a second focusing element arranged in the second light path, wherein the first focusing element comprises a focal length which is different from the focal length of the second focusing element, such that the main focus is shifted between the first axial position and the second axial position.

These embodiment uses especially robust and low-cost components.

In certain embodiments, the focusing device comprises a second beam splitter configured to join the first light path and the second light path and direct the light beam along a joined light path.

In certain embodiments, the second beam splitter is a polarizing beam splitter. In particular, the second polarizing beam splitter is configured such that the light which has been reflected by the first polarizing beam splitter is reflected back into the joined light path by the second polarizing beam splitter and the light which has been transmitted by the first polarizing beam splitter is transmitted into the joined light path by the second polarizing beam splitter.

In certain embodiments, the second beam splitter is a non-polarizing beam splitter (e.g., a 50/50 beam splitter), wherein the focusing device comprises a first polarization modifying element arranged in the first light path or the second light path, wherein the first polarization modifying element is configured to rotate the polarization of the light beam back from the second polarization direction to the first polarization direction. In particular, the first polarization modifying element is a passive element, such as a $\lambda/2$ plate. The first polarization modifying element is arranged in the (first or second) light path in which the light beam has the second polarization direction resulting from the rotation by the first polarization switching element, and thus ensures that the light traveling through the first and second light path has the same polarization, which may be important for downstream applications, such as phase or amplitude modulation of the light beam. The non-polarizing beam splitter couples the light into the joined light path regardless of its polarization, particularly upon a partial loss of light intensity. Such a partial loss of light may be acceptable, particularly in applications requiring only low light doses, such as MINFLUX microscopy.

In certain embodiments, the focusing element is a lens, particularly a liquid lens and/or a varifocal lens. In certain embodiments, the focusing element is a mirror, particularly a deformable mirror and/or a parabolic mirror.

In certain embodiments, the focusing device comprises at least one light guiding element configured to guide the light traveling along the second light path from the first polarizing beam splitter to the second beam splitter. For instance, such light guiding elements may comprise or consist of one or several mirrors or any other suitable means known to the skilled person.

In certain embodiments, the focusing device comprises at least one wavefront modulator, comprising a first active area and a second active area, wherein the first active area and the second active area are configured to modulate a wavefront of the light beam dependent on the polarization of the light beam, wherein the first active area is configured to display a first polarization-dependent modulation pattern and the second active area is configured to display a second polarization-dependent modulation pattern.

In particular, the at least one wavefront modulator may be configured, such that the first active area selectively modulates the wavefront of light polarized in the first polarization direction and the second active area selectively modulates the wavefront of light polarized in the second polarization direction. This may be achieved by different polarization specificities of the first and second modulation pattern, or alternatively, by rotating the polarization of the light beam in the beam path between the first and the second active area, as described below.

Such a wavefront modulator is described in DE 10 2014 113 716 A1 and can be used to achieve a superposition of different light intensity distributions at the focus of a light beam, e.g., in STED or RESOLFT microscopy, e.g., a combination of a 2D donut (generated by a vortex phase pattern displayed on the first active area of the wavefront modulator) and a 3D donut/bottle beam (generated by a top-hat-shaped phase pattern displayed on the second active area of the wavefront modulator).

The wavefront may be modulated by being transmitted, reflected, or diffracted by the first and/or the second active area to modulate the phase distribution and/or the amplitude distribution of the light beam. For instance, a phase pattern may be encoded combined with a blazed grating on a spatial light modulator operated in diffraction mode. Alternatively, a phase pattern may be provided on a phase plate which is transmitted by the light beam.

In certain embodiments, the light path, particularly a single light path, along which the light beam propagates intersects the first active area and the second active area. This has the advantage that the focusing device takes up less space.

In particular, the focusing device further comprises a second polarization modifying element arranged in a beam path between the first active area and the second active area, wherein the second polarization modifying element is configured to rotate the polarization of the light beam, more particularly by 90°. Alternatively, the first active area may specifically modulate the wavefront of a light beam polarized in the first polarization direction and the second active area may specifically modulate the wavefront of a light beam polarized in the second polarization direction. In particular, the second polarization modifying element is a passive element, e.g., a $\lambda/2$ plate, configured to rotate the polarization of the light beam independently of a switching signal.

In certain embodiments, the wavefront modulator is the focusing element, wherein the first modulation pattern is adapted to mediate formation of the main focus at the first axial position and the second modulation pattern is adapted to mediate formation of the main focus at the second axial position. This may be achieved, e.g., by displaying a phase pattern introducing a defocus aberration (e.g., as approximated by the corresponding Zernike polynomial) on a spatial light modulator arranged in a plane conjugated to the pupil plane (back focal plane) of the microscope objective.

In certain embodiments, the first modulation pattern and the second modulation pattern are adapted to modulate the light beam in an identical manner regardless of whether the light beam is polarized in the first polarization direction or the second polarization direction. According to this embodiment, in particular, the at least one wavefront modulator is not used as a focusing element, but downstream of the focusing element, e.g., to obtain a light distribution of a certain shape at the focus of the light beam. For instance, a donut-shaped light distribution may be generated for STED or MINFLUX microscopy by phase modulation with a vortex phase pattern on a spatial light modulator. This phase modulation requires a defined polarization of the light beam. Using specially adapted modulation patterns on the first and second active area of the at least one wavefront modulator, it can be ensured (without the optional second polarization switching element, see below), that the same beam shape is achieved regardless of the polarization of the light beam downstream of the focusing element.

In certain embodiments, the first active area and the second active area are formed by a single wavefront modulator. Alternatively, the first active area and the second active area may be formed by separate wavefront modulators. Both configurations may be referred to here as a double pass configuration.

In certain embodiments, the second polarization modifying element is a λ/2 plate which is configured to be passed once by the light beam between the first active area and the second active area, or the second polarization modifying element is a λ/4 plate which is configured to be passed twice by the light beam between the first active area and the second active area. This may be achieved, e.g., by combining the λ/4 plate with a reflective element, as described in DE 10 2014 113 716 A1.

In certain embodiments, the polarization specificity of the wavefront modulator may match the (initial) polarization direction of the light beam, particularly wherein the focusing device may be configured such that the light beam is modulated in a single pass of the wavefront modulator (i.e., single transmission through or reflection or diffraction from an active area of the spatial light modulator).

In particular, when combined with the first EOM for controlling the phase shift between the first component and the second component of the light beam, the first active area and the second active area may be arranged such that a first part of the light beam is modulated by the first active area and the second part of the light beam is modulated by the second active area. For example, the first active area may display a phase pattern acting as a polarization rotator, e.g., a halfwave plate, such that the polarization of the light beam is rotated by 90°, while the second active area does not modulate the light beam. In this manner, the component of the light beam that has been phase shifted by the first EOM is rotated in the respective part of the beam.

In certain embodiments, the focusing device may further comprise a polarizer in a light path behind the first EOM and the wavefront modulator comprising the first active area and the second active area.

In particular, when the light beam is subsequently focused by an objective lens, the two components of the light beam will interfere to form a desired intensity distribution at the focus, in particular an intensity distribution with a local minimum, ideally an intensity zero, at the focus. By controlling the phase shift of the components by the first EOM, in particular, an axial position of the focus of the light beam (in particular an axial position of the local minimum) may be quickly shifted. In addition, a lateral position of the focus may also be adjusted in a similar manner.

According to another embodiment, particularly, when using a double pass configuration of the wavefront modulator, where the respective components of the light beam are modulated in two subsequent interactions with the wavefront modulator (or different wavefront modulators), the focusing device may further comprise a polarization rotator, particularly a passive polarization rotator, such as a halfwave plate, arranged in a beam path between the wavefront modulator and the polarizer, wherein the polarization rotator is configured and arranged such that the two orthogonal components of the light beam are rotated such that they are oriented at an angle of 45° with respect to the polarizer, such that the two components are parallel to each other after passing through the polarizer. In this manner, the modulated components can be combined, such that after focusing of the light beam by an objective lens, the components interfere to form a desired intensity distribution at the focus. By controlling the relative amplitude and/or the phase shift between the components using the first EOM and/or the second EOM described above, the axial position of the focus (and optionally also the lateral position of the focus) may be adjusted. This may be applied, e.g. for fast focusing, e.g. in a MINFLUX method, where an intensity distribution with a local minimum, ideally an intensity zero, is applied to localize or track a single emitter.

In certain embodiments, the focusing device comprises a second polarization switching element, particularly a second Pockels cell, configured to rotate the polarization of the light beam back from the second polarization direction to the first polarization direction after passing the focusing element.

As mentioned above, for certain microscopic applications, a defined polarization of the light beam after passing the focusing device is necessary independently of the axial focus position, e.g., for generation of a donut-shaped excitation or STED beam in MINFLUX or STED microscopy.

Thus, for example in these cases, the second polarization switching element or the above-described first polarization modifying element combined with a non-polarizing beam splitter (as described above) may be provided to restore the original linear polarization of the light beam. The second polarization switching element may be synchronized with the first polarization switching element (either directly or via a control device). E.g., assuming that the light beam initially has the first polarization direction, the second polarization switching device may only be triggered if the first polarization switching element has also been triggered to rotate the polarization from the first polarization direction to the second polarization direction. In this manner, after passing the focusing device, the light beam would always have the same polarization regardless of the current axial focus position.

In certain embodiments, the first polarization switching element and/or the second polarization switching element may be switchable fiber coupler configured to selectively couple different linear polarized light components (e.g., generated by different lasers) into a light conducting fiber. Alternatively, in certain embodiments, the first polarization switching element may comprise at least one switchable shutter or light attenuator, e.g., an acousto-optic modulator configured to selectively attenuate linear polarized light components (e.g., generated by different lasers).

In certain embodiments, the focusing device comprises a telescope comprising a first telescope lens and a second telescope lens, wherein the telescope is configured to generate an intermediate focus of the light beam between the first telescope lens and the second telescope lens, wherein the focusing element is configured to shift an axial position of the intermediate focus dependent on the polarization of the light beam. In particular, the focusing element is arranged between the first telescope lens and the second telescope lens.

In certain embodiments, the telescope is the focusing element.

The light beam exiting the second lens may be collimated or may deviate from a collimated beam depending on the position of the intermediate focus.

In particular, the first telescope lens and the second telescope lens are arranged along the first optical axis. In particular, the focusing element is arranged between the first telescope lens and the second telescope lens.

In certain embodiments, the focusing device comprises an adjusting device, particularly comprising a varifocal lens, a wavefront modulator or at least one mechanical actuator, wherein the adjusting device is configured to gradually adjust the axial position of the main focus and/or the intermediate focus.

Importantly, the adjusting device does not necessarily have to operate at the same time scale as the first polarization switching device, since the gradual adjustment of the axial focus shift induced by the focusing unit may be performed, e.g., during an alignment procedure before an actual experiment. Hence, e.g., relatively slow and cheap varifocal lenses (e.g., liquid lenses) may be used in the adjustment device.

Wavefront modulators, such as liquid crystal based pixelated spatial light modulators (SLMs), may be used, e.g., to generate an axial focus shift by phase modulation of the light beam. This additional use as a focus adjustment device is especially advantageous in microscopes, where such a light modulator is already present for other purposes, such as in STED or MINFLUX microscopes, where SLMs are used to generate a light distribution with a central local minimum (e.g., a doughnut) at the focus.

In certain embodiments, the focusing device comprises a polarized light source configured to generate a linearly polarized light beam, or a polarizer configured to linearly polarize the light beam (in case of a non-polarized light source). Linear polarization ensures that the polarization direction can be switched in a defined manner by the first polarization switching device to adjust the optical path length by the path length selection device and thus adjust the axial focus position.

A second aspect of the disclosure relates to a focusing system for a microscope comprising at least two focusing devices according to the first aspect, wherein the focusing system comprises a third beam splitter configured to selectively direct the light beam along a first branch and a second branch, wherein a respective one of the at least two focusing devices is arranged in the first branch and the second branch.

In certain embodiments, the third beam splitter is a polarizing beam splitter configured to direct the light beam along the first branch and the second branch dependent on the polarization of the light beam, wherein the focusing system comprises a third polarization switching device, particularly a third Pockels cell, configured to adjust the polarization of the light beam before passing the third beam splitter.

In other words, two or more of the focusing devices are connected in parallel in the focusing system. In particular, the resulting shift in axial focus position is different in the at least two focusing devices. In this manner, e.g., for two parallel focusing devices, up to four different axial focus positions may be selected by controlling the third beam splitter and the first polarization switching elements of the focusing devices in the different branches. This improves the versatility of the system, which may be especially advantageous, e.g., in MINFLUX microscopy, wherein the scanning patterns (including the axial coordinates) relative to the current position estimate of the molecule or particle are often adapted iteratively.

Furthermore, a serial connection of two or more of the focusing devices may also be of advantage in certain situations. In this configuration, the axial shifts of the individual focusing devices would add up resulting in a combined axial focus shift of the main focus of the microscope.

A third aspect of the disclosure relates to a microscope, particularly a MINFLUX microscope, for imaging or localizing molecules or particles in a sample.

The microscope comprises a light source configured to provide a light beam. In particular, the light source is a laser source (pulsed or continuous). In particular, the light source is configured to generate linearly polarized light, or the microscope comprises a polarizer configured to linearly polarize the light beam.

The microscope further comprises a microscope objective lens configured to generate a main focus of the light beam in or on the sample.

The microscope comprises at least one detector configured to detect light emanating from the molecules or particles. The detector may be a point detector (such as an avalanche photodiode, APD, a photomultiplier or a hybrid detector) or an array detector (such as an APD array, a CCD camera or a CMOS camera). Particularly in case of a point detector, a detector pinhole may be provided in a plane which is conjugated to the focal plane in the sample (confocal detection).

The microscope comprises the focusing device according to the first aspect or the focusing system according to the second aspect, wherein the first polarization switching element of the focusing device is configured to rotate the polarization of the light beam between the first polarization direction and the second polarization direction upon receiving a switching signal, and wherein the focusing element is configured to axially displace the main focus generated by the microscope objective lens between a first axial position and a second axial position dependent on the polarization of the light beam.

In certain embodiments, the microscope comprises a scanning device configured to scan the main focus over the sample or through the sample (particularly in two dimensions, i.e., laterally, or in three dimensions, i.e., laterally and axially). The scanning device may, e.g., be a galvanometric scanner or a piezoelectric scanner. In particular, the scanning device is used for coarse lateral scanning of the sample, e.g., to obtain a pre-scan or to move the main focus to a region of interest in the sample, and the focusing device according to the present disclosure is involved in fine positioning, e.g., for scanning a 3D pattern around the position estimate of an emitting molecule in MINFLUX microscopy.

In certain embodiments, the microscope comprises at least one lateral deflection device, particularly an electro-optic deflector or an acousto-optic deflector. In particular, such deflection devices may be used for fine lateral positioning of the main focus, e.g., combined with the focusing device according to the disclosure for scanning a 3D pattern around the position estimate of an emitting molecule in MINFLUX microscopy.

In certain embodiments, the microscope comprises a wavefront modulator configured to generate a local intensity minimum of the light beam at the main focus. The wavefront modulator may be, e.g., a phase plate or a spatial light modulator (SLM).

In certain embodiments, the microscope comprises or is connected to a processor configured to determine a position estimate of the molecule or particle based on the detected light at the respective positions. The processor may, e.g., be a general-purpose processor (such as a personal computer), a microprocessor, a field programmable gate array (FPGA) or an application specific integrated circuit (ASIC). The processor (or a separate device) may also be configured to control various components of the microscope.

In certain embodiments, the focusing device is arranged in an illumination beam path of the microscope, particularly between the light source and a beam separator separating the illumination beam path from a detection beam path, in which the detector is arranged. In this manner, polarization of the detection light (e.g., fluorescence light from fluorophores in the sample) is avoided. More particularly the focusing device is arranged between the light source and the wavefront modulator. In particular, according to this setup, the detection light is not de-scanned. Therefore, this embodiment advantageous especially when no pinhole is arranged in the detection beam path, which would block out at least a part of the detection light if the focal plane is axially shifted without de-scanning. The confocal pinhole can be omitted, e.g., in certain microscopic setups for single molecule localizations such as MINFLUX, and/or if a position-specific detector (so-called array detector) is used.

A fourth aspect of the disclosure relates to a method, particularly a MINFLUX method, for imaging or localizing molecules or particles in a sample, particularly using the focusing device according to the first aspect, the focusing system according to the second aspect and/or the microscope according to the third aspect. The method comprises generating a linearly polarized light beam, generating a main focus of the light beam in or on a sample, and detecting light emanating from the molecules or particles, wherein a polarization of the light beam is rotated around the first optical axis from the first polarization direction to the second polarization direction (particularly by the first polarization switching element), and the main focus is axially displaced between a first axial position and a second axial position dependent on the polarization of the light beam.

In certain embodiments, the main focus of the light beam comprises a local intensity minimum. In particular, the local intensity minimum is flanked by maxima (or a ring-shaped maximum). More particularly, the local intensity minimum is donut-shaped or bottle-beam-shaped.

In certain embodiments, the method comprises positioning the local intensity minimum at a plurality of positions in the sample, the positions forming a first pattern, particularly a three-dimensional pattern, around and/or including a position estimate of a single molecule or particle in the sample, wherein light emanating from the molecule or particle is detected for each position of the first pattern.

In certain embodiments, the method comprises determining a position estimate of the molecule or particle based on the detected light at the respective positions. In particular, the method according to this embodiment is a MINFLUX localization method, more particularly a 3D MINFLUX localization method.

In certain embodiments, the main focus is displaced between exactly two positions in a stepwise manner.

In certain embodiments, the light beam is directed along a first light path and a second light path, particularly by the first polarizing beam splitter, dependent on the polarization of the light beam. In particular, the focusing element is arranged in the first light path or the second light path, or the focusing device comprises a first focusing element arranged in the first light path and a second focusing element arranged in the second light path, wherein the first focusing element and the second focusing element comprise different focal lengths.

In certain embodiments, the first light path and the second light path are joined into a joined light path, particularly by the second beam splitter. In particular, the first and the second light beam are joined in a polarization-dependent manner, or the first and the second light beam are joined in a polarization-independent manner, wherein the polarization of the light beam is rotated back to the second polarization direction, particularly by the first polarization modifying element, in the first light path or the second light path.

In certain embodiments, the polarization of the light beam is rotated back from the second polarization direction to the first polarization direction after passing the focusing element, particularly by the second polarization switching element.

In certain embodiments, an intermediate focus of the light beam is generated, particularly between the first telescope lens and the second telescope lens. In particular, an axial position of the intermediate focus is shifted dependent on the polarization of the light beam.

In certain embodiments, the first axial position and/or the second axial position of the main focus is gradually adjusted, particularly by the adjusting device.

Further favorable embodiments of the method, the microscope and the focusing system according to the disclosure have already been mentioned in the context of the focusing device according to the present disclosure.

SHORT DESCRIPTION OF THE FIGURES

The present disclosure is further elucidated and described hereafter with reference to the exemplary embodiments displayed in the figures. These embodiments are non-restrictive examples which are not meant to limit the scope of the present disclosure.

FIGS. 1A-1B shows a focusing device according to a first embodiment using a birefringent crystal as a focusing element;

FIGS. 2A-2C shows a focusing device according to a second embodiment using a focusing element combined with polarizing beam splitters;

FIGS. 3A-3B shows a focusing device according to a third embodiment using a telescope as a focusing element;

FIGS. 4A-4B shows embodiments, in which the polarization of the light beam is rotated back after passing the focusing element;

FIGS. 5A-5B shows embodiments of focusing systems comprising two focusing devices in a parallel arrangement;

FIG. 6 shows a microscope comprising the focusing device;

FIG. 7 shows a MINFLUX microscope comprising the focusing device;

FIG. 8 shows a system comprising a wavefront modulator combined with a second polarization modifying element according to a first embodiment;

FIG. 9 shows a system comprising a wavefront modulator combined with a second polarization modifying element according to a second embodiment;

FIG. 10 shows an embodiment of a first polarization switching element comprising a polarizing beam splitter and two acousto-optic modulators;

FIG. 11 shows a further embodiment of the focusing device comprising an electrooptic modulator and a wavefront modulator in a single pass configuration;

FIG. 12 shows a further embodiment of the focusing device comprising an electrooptic modulator and a wavefront modulator in a double pass configuration.

DESCRIPTION OF THE FIGURES

FIG. 1 shows a first embodiment of the focusing device 1 according to the present disclosure, wherein

Figure 6:
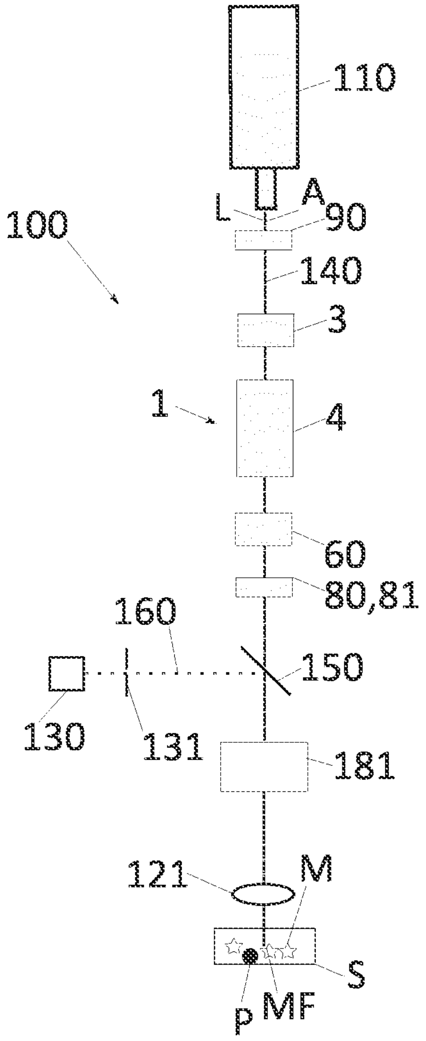

The light beam L, which propagates along the optical axis A is linearly polarized, either directly by a polarizing light source or by a polarizer 90 (see FIG. 6). Initially, the light beam L is linearly polarized in the first polarization direction P1.

Figure 1A:
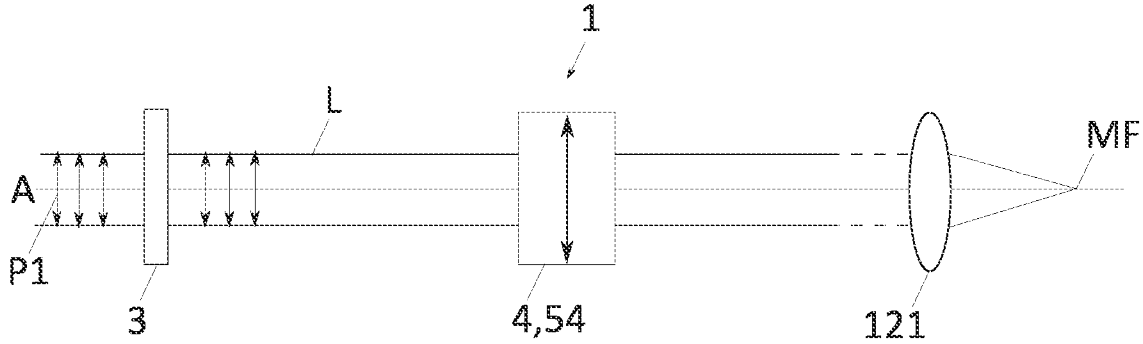
FIG. 1A and FIG. 1B show different states of the focusing device 1 associated with different axial positions of a main focus MF of a light beam L, the main focus MF being generated by a microscope objective lens 121. The focusing device 1 comprises a polarization switching element 3 (e.g., a Pockels cell) and a polarization-dependent focusing element 4, which is a birefringent element 54 (e.g., a birefringent crystal) according to the example shown in FIG. 1.
Figure 1B:
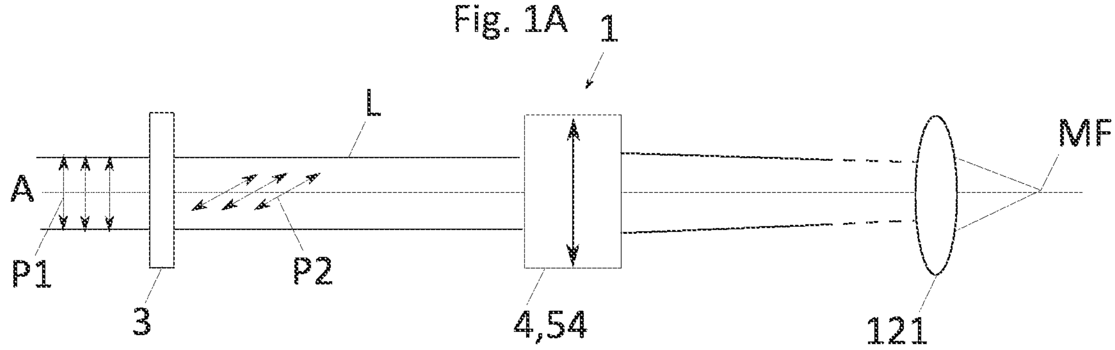

The polarization switching element 3 is configured to rotate the polarization of the light beam L from the first polarization direction P1 to the second polarization direction P2, which is particularly perpendicular to the first polarization direction P1 (FIG. 1B). This rotation of the polarization may be achieved, e.g., by the electro-optic effect. To trigger rotation of the polarization, an electrical switching signal may be transmitted from a control circuit to the polarization switching element 3 (not shown). Advantageously, the polarization switching element 3 is able to switch the polarization direction quickly, e.g., at a switching rate of at least 2 kHz, particularly at least 5 kHz. Switching rates in the range between 2-5 kHz can be achieved with commercially available Pockels cells, for example.

The birefringent element 54 has a first refractive index for light of the first polarization direction P1 and a second refractive index different from the first refractive index for light of the second polarization direction P2. An ordinary axis of the birefringent element 54 is parallel to the first polarization direction P1 and perpendicular to the second polarization direction P2.

The beam path of the light beam L continues towards a microscope objective lens 121, which generates a main focus MF in a sample S (see FIG. 6) to be observed with the microscope 100. Other optical components in the beam path between the focusing device 1 and the objective lens 121 are not shown for simplicity in FIG. 1 but will be discussed below with respect to FIGS. 6 and 7.

Due to the difference in refractive indices, the light beam L is no longer collimated after passing the birefringent element 54 in the state shown in FIG. 1B, and a slight axial shift of the main focus MF occurs.

Figure 2A:
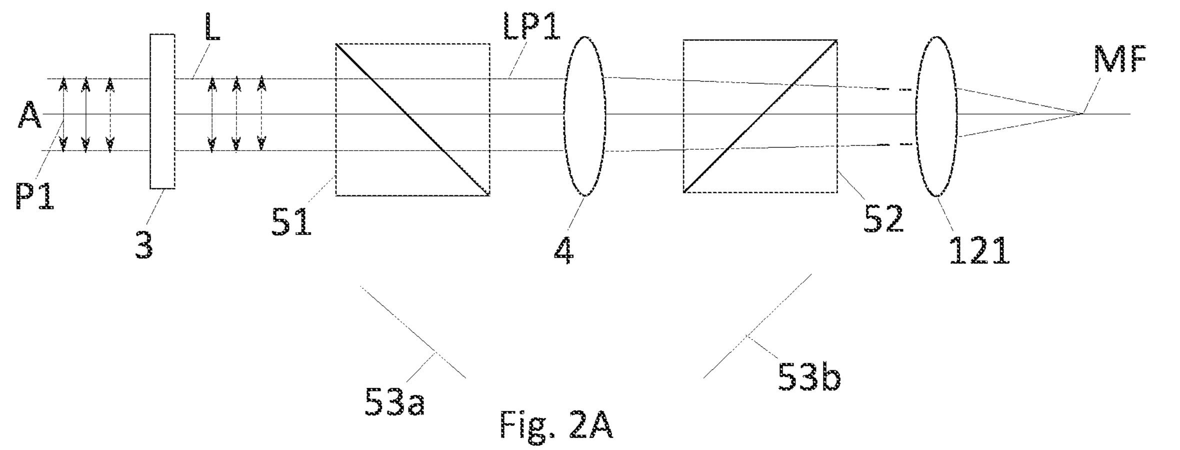
Figure 2B:
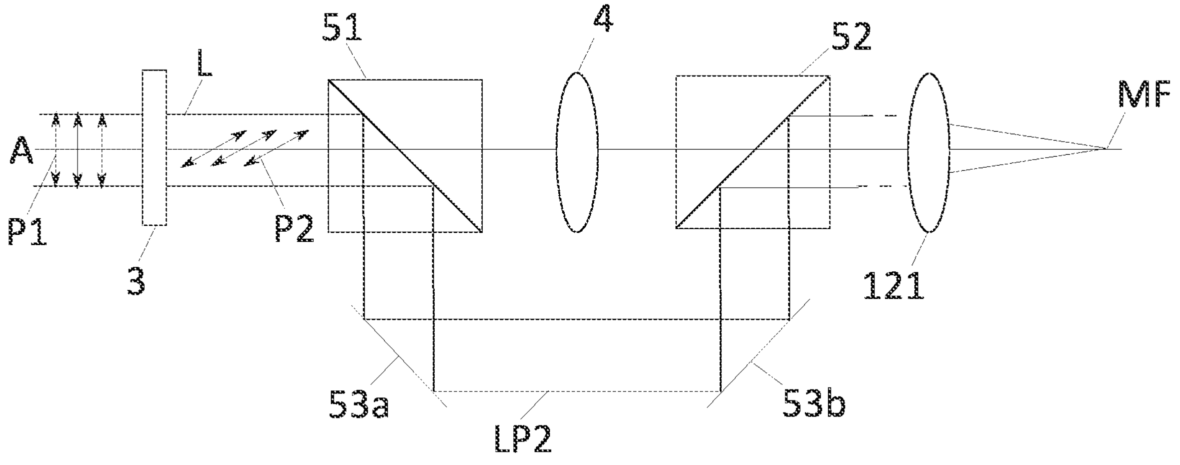

FIG. 2 shows a further embodiment of the focusing device 1 according to the present disclosure comprising a polarization switching element 3, a focusing element 4, a first polarizing beam splitter 51 and a second beam splitter 52. FIG. 2A and FIG. 2B show different states of the polarization switching element 3: In the situation depicted in FIG. 2B, the polarization of the light beam L is rotated from the first polarization direction P1 to the second polarization direction P2 by the polarization switching element 3.

The first polarizing beam splitter 51 selectively directs the light beam L along a first light path LP1 (by transmission) or along a second light path LP2 (by reflection)—light comprising a linear polarization in the second polarization direction P2 is reflected by the first polarizing beam splitter 51 and thus directed along the second light path LP2. In the second light path LP2, the light beam L is guided by mirrors 53*a*, 53*b*.

A focusing element 4 configured to focus the light beam L, e.g., a lens, is arranged either in the first light path LP1 (see FIG. 1A and FIG. 1B) or the second light path LP2 (not shown). The first light path LP1 and the second light path LP2 are re-joined by a second beam splitter 52, which may be a polarizing beam splitter that reflects light with a polarization in the second polarization direction P2 and transmits light with a polarization in the first polarization direction P1.

By selectively guiding the light beam L along the first light path LP1 or the second light path LP2 by means of the polarization switching element 3, the light beam 4 is either focused by the focusing element 4, or remains collimated, which results in an axial shift of the main focus MF between the two states.

In particular, the focus length of the focusing element 4 is significantly longer than the optical path length between the first polarizing beam splitter 51 and the second beam splitter 52, such that only a small shift of the axial position of the main focus MF occurs.

Figure 2C:
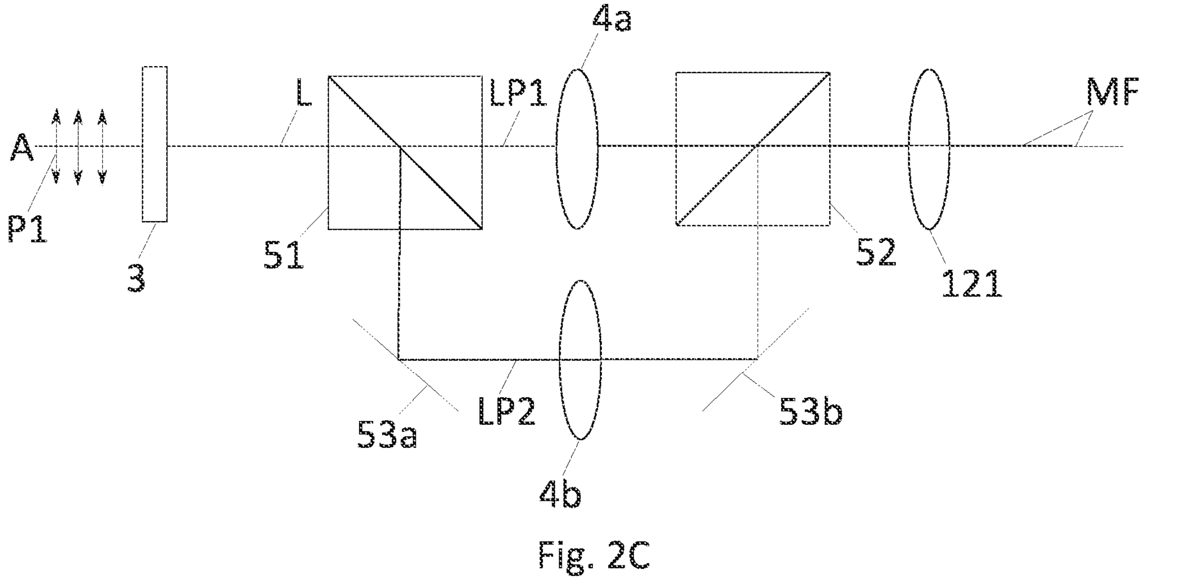

FIG. 2C depicts a variant of the focusing device 1 shown in FIGS. 2A and 2B comprising a first focusing element 4*a*, e.g., a first lens, arranged in the first light path LP1 and a second focusing element 4*b*, e.g., a second lens, in the second light path LP2, wherein the focus length of the first focusing element 4*a* is different from the focus length of the second focusing element 4*b*.

Figure 3A:
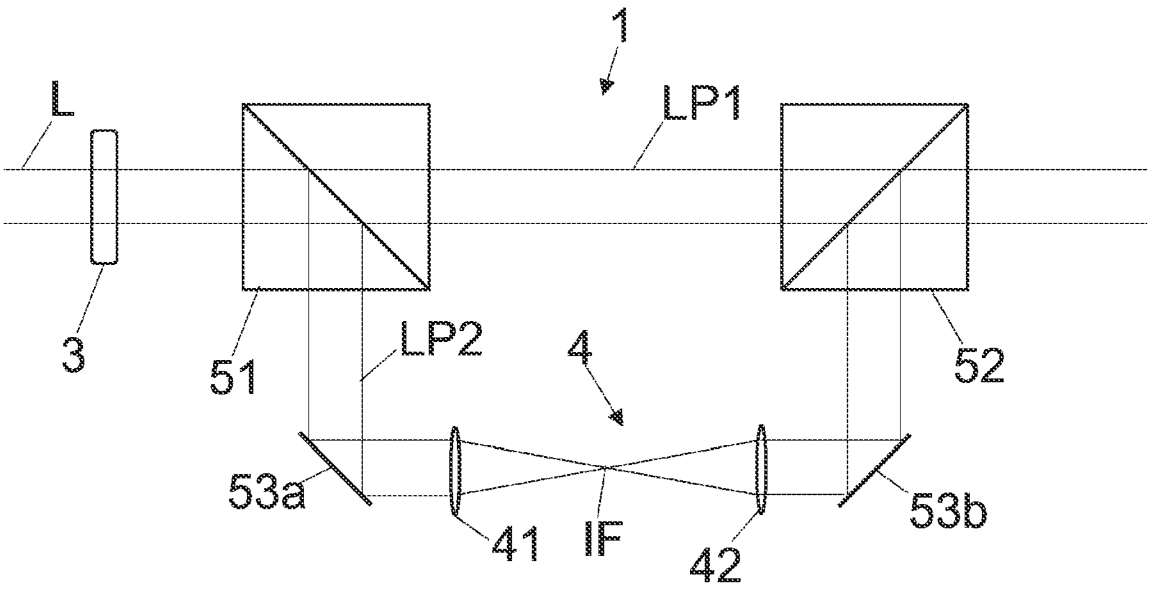

FIG. 3A illustrates a further variant of the focusing device 1 shown in FIG. 2 comprising a telescope as a focusing device 4. The telescope comprises a first telescope lens 41 and a second telescope 42 arranged in the first light path LP1 or the second light path LP2 to generate an intermediate focus IF.

Figure 3B:
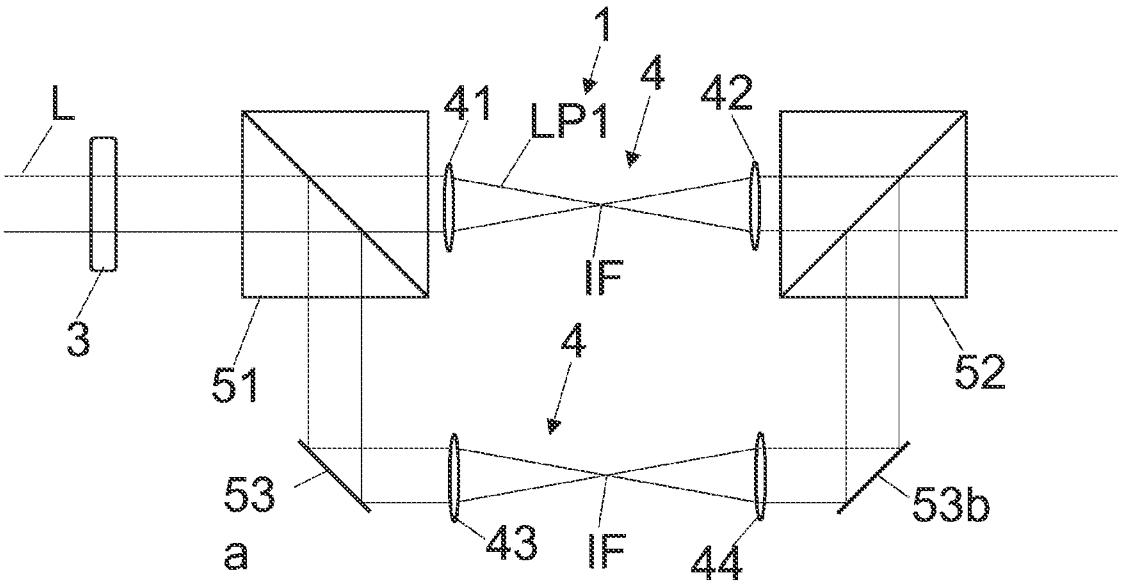

FIG. 3B shows an embodiment comprising a first telescope comprising a first telescope lens 41 and a second telescope lens 42 in the first light path LP1 and a second telescope comprising a third telescope lens 43 and a fourth telescope lens 44 in the second light path LP2, wherein the first and the second telescope generate intermediate foci IF at different positions between the respective telescope lenses, such that the main focus MF is shifted by selectively directing the light beam L along the first light path LP1 or the second light path LP2.

In certain situations, it is important to ensure that the light beam L has the same polarization after passing the focusing device 1 regardless of its state and the corresponding axial position of the main focus MF. For example, the light beam L may need to be amplitude or phase modulated by a polarization sensitive wavefront modulator, e.g., to generate a light distribution with a central minimum at the main focus MF (e.g., for STED or MINFLUX microscopy). If the light beam L had different polarization directions at different axial focus positions, this would disrupt the desired light distribution at polarization directions not matched to the wavefront modulator.

Figure 4A:
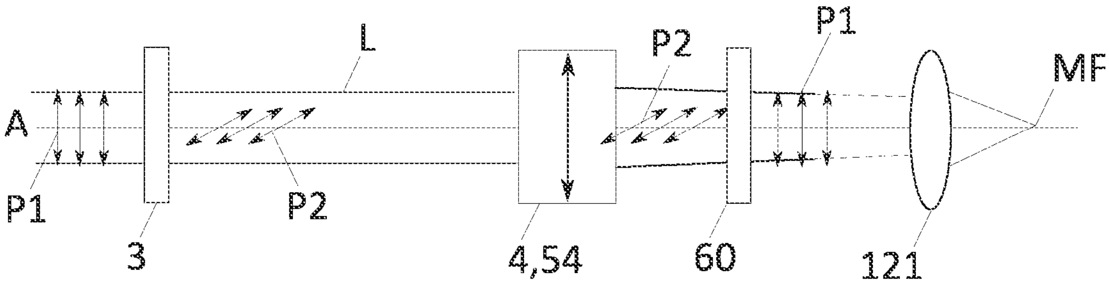
Figure 4B:
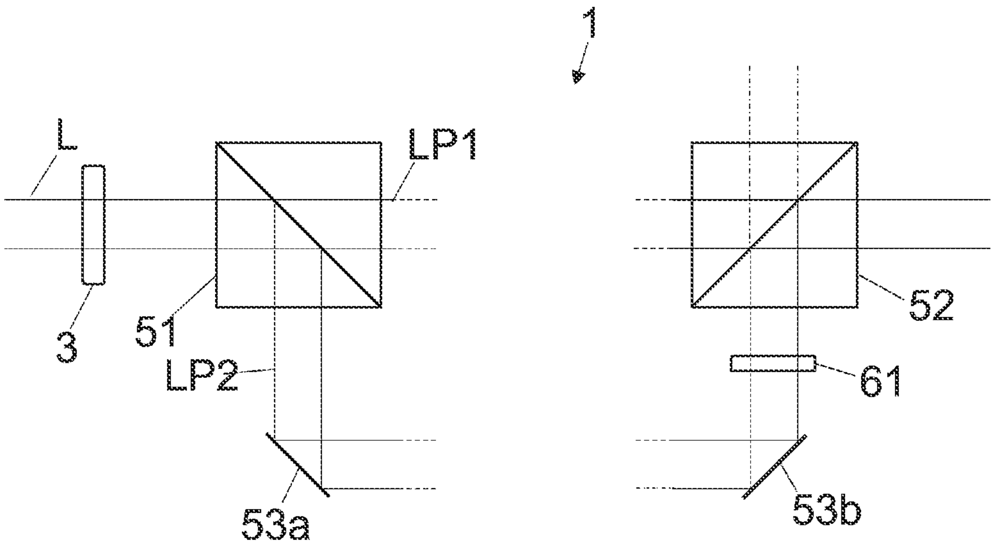

FIGS. 4A and 4B show two alternative solutions to this problem.

According to the embodiment shown in FIG. 4A, the focusing device 1 further comprises a second polarization switching element 60 configured to rotate the polarization of the light beam L back from the second polarization direction P2 to the first polarization direction P1 after passing the focusing element 4. The second polarization switching element 60 is synchronized with the first polarization switching device 3, such that the second polarization switching element 60 and the first polarization switching element 3 receive corresponding switching signals. The switching signals may be sent essentially simultaneously from a control circuit to both polarization switching elements, or a switching signal may be sent from the first polarization switching element 3 to the second polarization switching element 60, for example.

Although FIG. 4A shows a birefringent focusing element 54, the second polarization switching element can be combined with any of the above-described embodiments, in particular also the embodiments comprising polarizing beam splitters (FIGS. 2 and 3).

FIG. 4B shows a variant of the embodiments shown in FIG. 2 or FIG. 3, which comprise a first polarizing beam splitter 51 to selectively direct the light beam L along the first light path LP1 and the second light path LP2. To rotate the polarization of the light beam L back to the first polarization direction P1, a passive first polarization modifying element 61 (e.g., a λ/2 plate) is arranged in the second light path LP2. Since a polarizing beam splitter cannot be used to join the first light path LP1 and the second light path LP2 in this configuration, the second beam splitter 52 is a non-polarizing beam splitter (e.g., a neutral 50/50 beam splitter). This results in a partial loss of light of the light beam L, which may be tolerable especially in low-light-dose applications such as MINFLUX microscopy. This embodiment reduces the costs and complexity of the focusing device 1 shown in FIG. 4A, since a uniform polarization after passing the focusing device 1 can be achieved without the synchronization of two polarization switching elements.

Figure 5A:
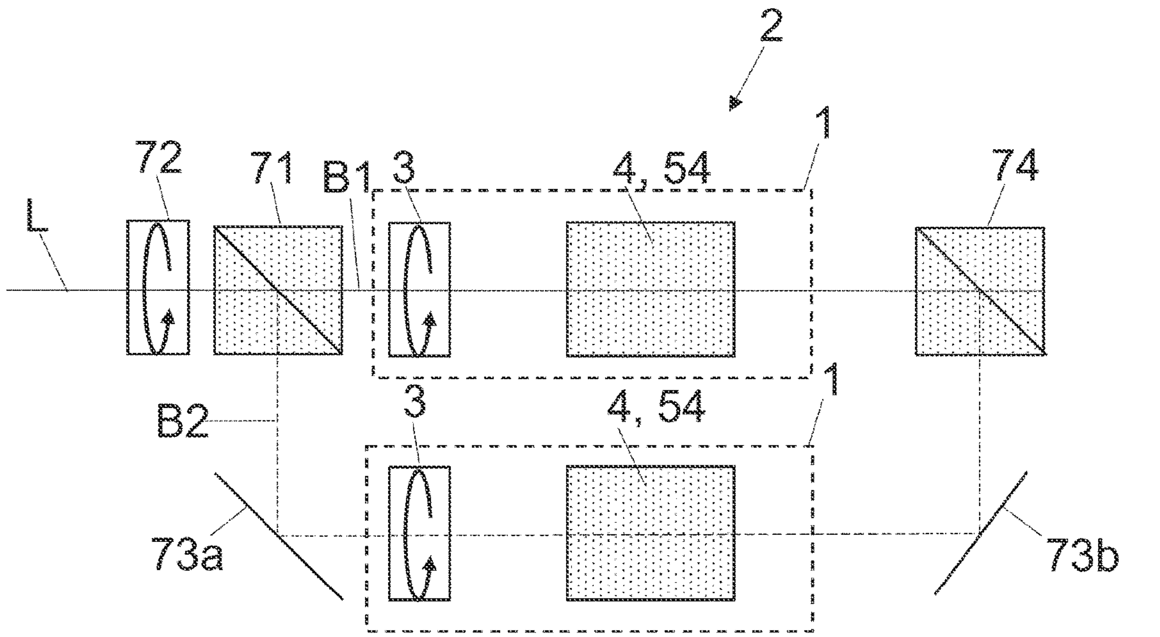
Figure 5B:
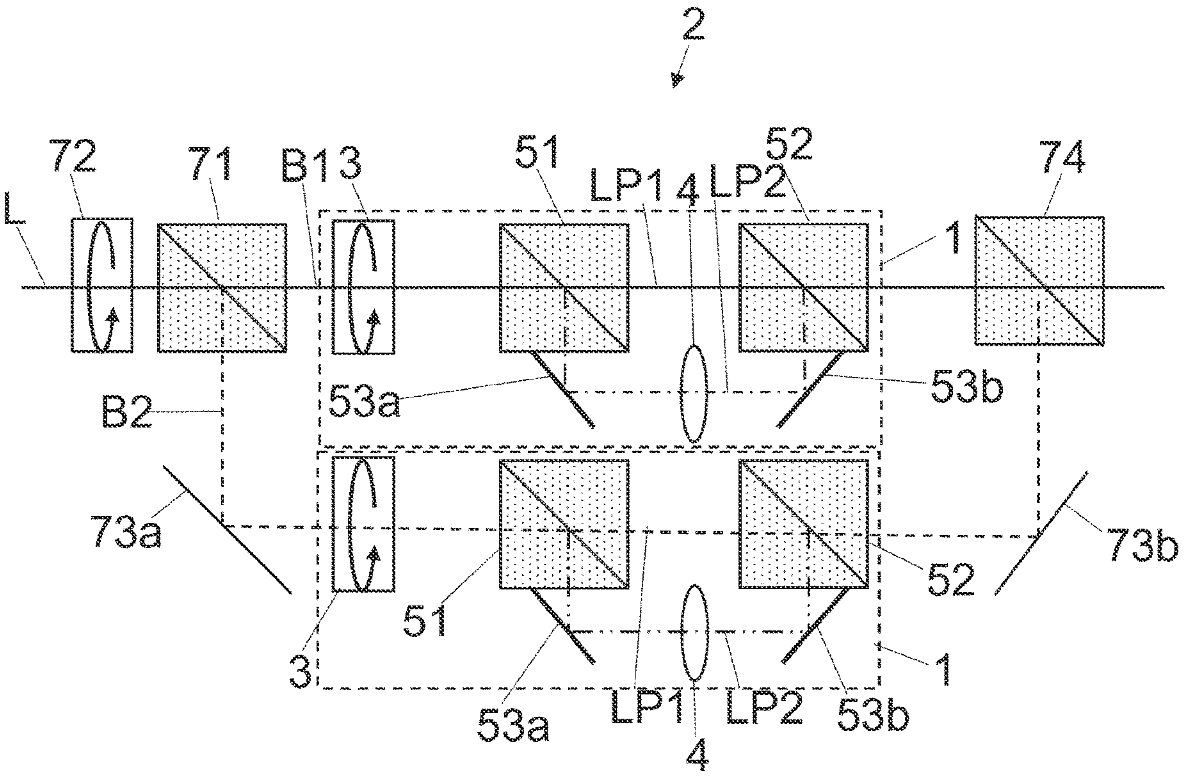

FIG. 5A and FIG. 5B show focusing systems 2 comprising two focusing devices 1 according to the present disclosure arranged in parallel. The focusing devices 1 of the focusing system 2 shown in FIG. 5A comprise a birefringent focusing element 54, as described above for the embodiment shown in FIG. 1. The focusing devices 1 of the focusing system shown in FIG. 5B comprise a first polarizing beam splitters 51, a second beam splitter 52, mirrors 53*a*, 53*b* and a focusing element 4 arranged in a first light path LP1 or a second light path LP2 as shown in FIG. 2 and described above.

The focusing system 2 according to both variants (FIG. 5A and FIG. 5B) comprises a third polarizing beam splitter 71 configured to selectively guide the light beam L along the parallel first branch B1 and second branch B2, which respectively comprise a focusing device 1, dependent on its polarization. The focusing system 2 further comprises a third polarization switching element 72, e.g., a Pockels cell, configured to rotate the polarization of the light beam L from the first polarization direction P1 to the second polarization direction P2. Along the second branch B2, the light beam L travels via the third polarizing beam splitter 71, the third mirror 73*a* and the fourth mirror 73*b* towards a fourth beam splitter 74, particularly a polarizing beam splitter. The branches B1, B2 are rejoined by the fourth beam splitter 74.

The focusing devices 1 arranged in the branches B1, B2 may be adjusted to different axial positions of the main focus MF. This concept can be generalized by including further branches comprising a focusing device 1 in parallel or in series, such that a higher number of focus positions can be set.

Optionally, to rotate the polarization of the light beam L back to the first polarization direction P1 synchronized with the upstream first and third polarization switching elements 3, 72, a second polarization switching element 60 may be positioned downstream of the fourth beam splitter 74, in analogy to the embodiment shown in FIG. 4A. Alternatively, the fourth beam splitter 74 may be a non-polarizing beam splitter and a first polarization modifying element 61 may be positioned upstream of the fourth beam splitter 74 (see FIG. 4B).

FIG. 6 shows a microscope 100 configured as a scanning microscope, comprising a focusing device 1 according to the present disclosure. The microscope 100 comprises a light source 110 for generating the light beam L, and a polarizer 90 for linearly polarizing the light beam L.

The focusing device 1 is arranged in an illumination beam path 140 which is separated from a detection beam path 160 by a beam separator 150, particularly a dichroic mirror. After passing the focusing device 1, the light beam L is transmitted by the beam separator 150 and is focused by a microscope objective lens 121. Thereby, a main focus MF of the illumination light is generated in a sample S.

The sample S contains molecules M (e.g., fluorophores) which emit light (e.g., fluorescence light) in response to being illuminated by the illumination light, and/or particles P, which may, e.g., reflect the illumination light.

The main focus MF is scanned over the sample S by a scanning device 181 which may be, e.g., a galvanometric scanner.

The light emitted by the molecules M enters the microscope objective lens 121, is de-scanned by the scanning device 181 and reflected by the beam separator 150. In the detection beam path 160 a confocal pinhole 131 and a point detector 130 are arranged to detect the light emitted by the molecules M.

A single focusing device 1 is shown in FIG. 6 for simplicity. However, a focusing system 2, e.g., comprising a parallel arrangement of focusing devices such as shown in FIGS. 5A and 5B is also possible.

The focusing device 1 comprises a first polarization switching element 3, and a focusing element 4, as described above.

An optional second polarization switching element 60, which can be used to rotate the polarization of the light beam L back to the first polarization direction P1, is also shown in FIG. 6.

Furthermore, an adjustment device 80 is shown in the illumination beam path 140 after the focusing device 1. The adjustment device 80, which may be varifocal lens 81, can be used to gradually adjust the axial focus positions which can be switched by the focusing device 1 in a stepwise manner. For this purpose, a relatively slow and cheap varifocal lens 81 may be used, e.g., if gradual focus adjustment is used only during an alignment step and fast position switching by the focusing device 1 is used during an actual measurement/experiment. Alternatively, mechanical actuators (e.g., to adjust the positions of the telescope lenses depicted in FIG. 3) or a wavefront modulator may be used as an adjustment device 80 for gradual focus adjustment by introducing a defocus.

Arranging the focusing device 1 in the illumination beam path 140 has the advantage that the detection light (e.g., fluorescence light) detected by the detector 130 is not polarized.

Figure 7:
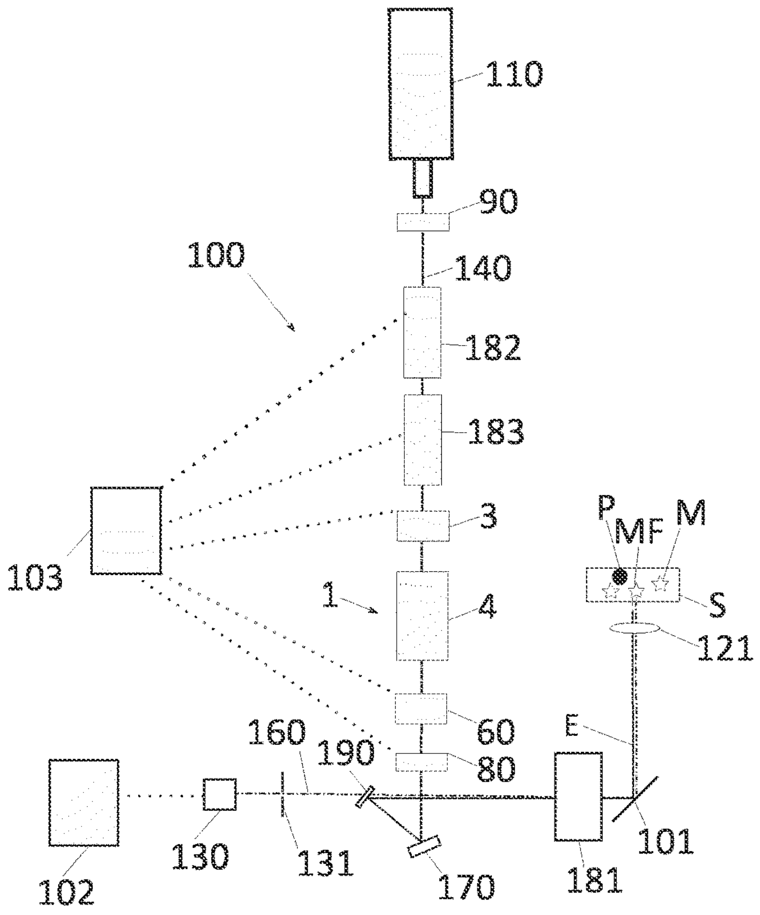

FIG. 7 depicts a further microscope 100, which comprises further components, such that it can be used, e.g., for MINFLUX microscopy.

In addition to the components shown in FIG. 6, the microscope 100 according to FIG. 7 comprises a first lateral deflection device 182 and a second lateral deflection device 183, a wavefront modulator 170, a mirror 101, an evaluation device 102 and a control device 103.

Furthermore, a notch filter 190 is used to split the illumination light from the detection light instead of the beam separator 150.

The first lateral deflection device 182 and the second lateral deflection device 183 are arranged in series in the illumination beam path 140, and may be used, e.g., for small (e.g., in the range of 1-100 nm), but fast (e.g., in a range of 1-200 μs) deflections of the light beam L in a lateral direction (perpendicular to the optical axis), for instance to position a local minimum of an excitation light distribution at positions in the vicinity of an estimated position of a single emitting molecule M or particle P (particularly during MINFLUX microscopy). The first lateral deflection device 182 and the second lateral deflection device 183 may be electro-optic deflectors or acousto-optic deflectors, for example. The first lateral deflection device 182 may be configured to deflect the light beam L along a first lateral direction (x), and the second lateral deflection device 183 may be configured to deflect the light beam L along a second lateral direction (y).

The focusing device 1 according to the present disclosure may be used for deflection of the light beam L in three dimensions combined with the first lateral deflection device 182 and the second lateral deflection device 183, e.g., during a 3D MINFLUX method, where the local minimum of the excitation light distribution is placed at positions forming a 3D pattern around an estimated molecule M position.

The wavefront modulator 170 may be used for phase or amplitude modulation of the light beam L, for instance to generate a light distribution with a local minimum at the main focus MF position. For example, the wavefront modulator 170 may comprise an active surface positioned in or close to a pupil plane (in other words a plane conjugated to the objective pupil, which is a Fourier plane of the focal plane/image plane), wherein a phase pattern is displayed on the active surface to modulate the phase distribution of the light beam L, such that the light distribution with the local minimum is formed in and around the focal plane by interference. In this manner, e.g., a donut-shaped or bottle-beam-shaped excitation light distribution may be formed for MINFLUX microscopy, or a similar depletion or inactivation light distribution may be generated for STED or RESOLFT microscopy.

In particular, the wavefront modulator 170 may be a spatial light modulator comprising an active surface on which a blazed grating overlaid with an adjustable phase pattern can be generated by liquid crystal-based pixels.

The phase-modulated light is reflected by the notch filter 190 and further travels via the scanning device 180 and the mirror 101 to the microscope objective lens 121. The detection light passes the notch filter 190 in the opposite direction and reaches the detector 130.

The evaluation device 102 receives a signal from the detector 130 indicating the light intensities or photon counts measured for each position of the light beam L and calculates an estimated position of the single molecule M based on the detected light intensities or photon counts and the positions of the light beam L (particularly during a MINFLUX method).

The control device 103 controls the components of the microscope 100. In particular, during MINFLUX microscopy, the control device 103 may control the scanning device 181, the first and second lateral deflection device 182, 183 and the focusing device 1 according to the present disclosure to position the light beam L at desired positions relative to a current estimated position of the molecule M to be localized.

Figure 8:
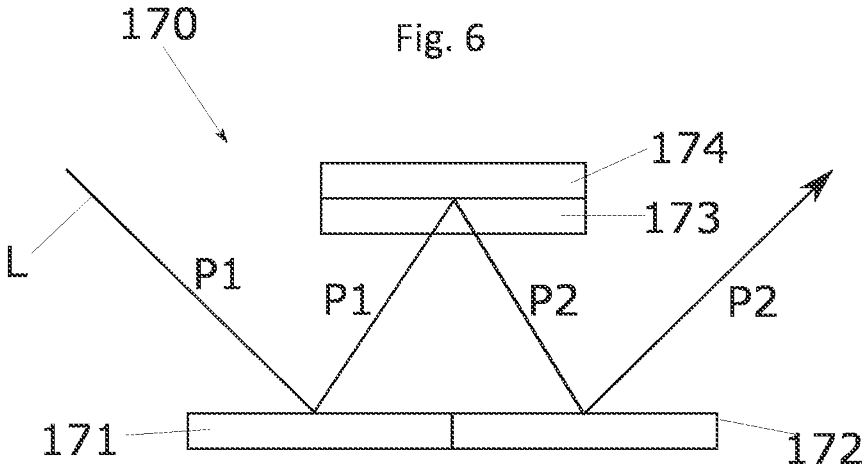
Figure 9:
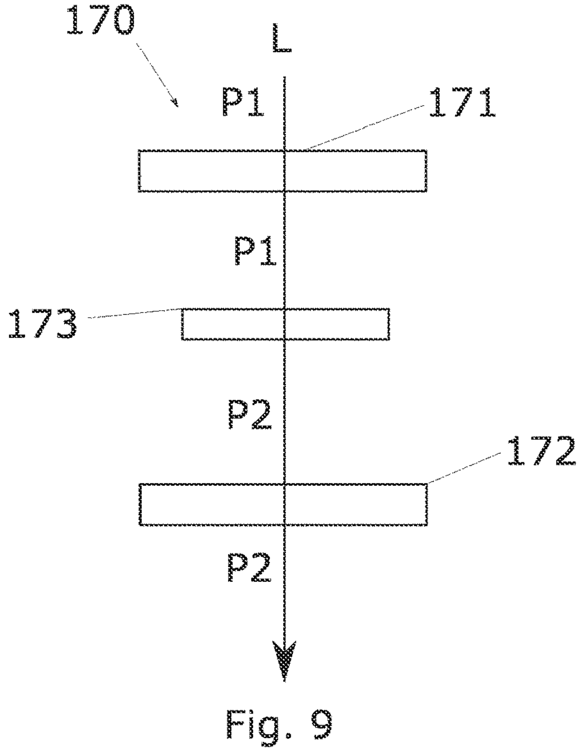

FIGS. 8 and 9 show two different configurations comprising a wavefront modulator 170 realizing a device (also termed 'Easy 3D module') as described in DE 10 2014 113 716 A1, which can be used in particular to phase-modulate light beams L of the first polarization direction P1 and the second polarization direction P2 in an identical manner.

The embodiment shown in FIG. 8 includes a wavefront modulator 170 consisting of a pixelated spatial light modulator operated in diffraction mode with a first active area 171 displaying a blazed grating overlaid with a polarization-sensitive first modulation pattern and a second active area

172 displaying a blazed grating overlaid with a polarization-sensitive second modulation pattern. The device is configured such that the wavefront of a light beam L with a certain linear polarization, e.g., polarized in the first polarization direction P1, is modulated by the first active area 171 and the second active area 172, and the wavefront of a light beam L with a linear polarization perpendicular to the certain linear polarization, e.g., the second polarization direction P2 is not modulated.

The wavefront modulator 170 further comprises a second polarization modifying element 173 configured to rotate the polarization of the light beam by 90° in a beam path between the first active area 171 and the second active area 172. The second polarization modifying element 173 may be a λ/4 plate attached to a reflective element 174.

In the depicted example, the light beam L initially has the first polarization direction P1. Thus, the wavefront of the light beam L is modulated by the first modulation pattern on the first active area 171. After being diffracted off the first active area 171, the light beam L is reflected by the reflective element 174 and thereby passes the second polarization modifying element 173 twice, such that its polarization is rotated by 90°. Thus, the light beam L has the second polarization direction P2 when being diffracted on the second active area 172. However, due to the polarization-dependent second modulation pattern on the second active area 172, the wavefront of the light beam L is not further modulated.

If the light beam L is initially polarized in the second polarization direction P2, the wavefront of the light beam L is not modulated by the first modulation pattern on the first active area 171. However, the polarization is rotated to the first polarization direction P1 by the second polarization modifying element 173, and the wavefront of the light beam L is thus modulated by the second modulation pattern on the second active area 172.

If an identical pattern is displayed on the first active area 171 and the second active area 172 (except for the polarization-sensitivity and possible shift or aberration corrections, or the like), the light beam L is phase modulated in an identical manner regardless of the axial focus position selected by the focusing device 1, without applying the optional second polarization switching element 60.

As shown in FIG. 9, the same principle can be realized with transmissive elements, namely, a first transmissive phase filter comprising the first active area 171 sensitive to the first polarization direction P1, a second transmissive phase filter comprising the second active area 172 sensitive to the second polarization direction P2, and a second polarization modifying element 173, particularly a λ/2 plate, between the first phase filter and the second phase filter.

The same effect described above for the embodiments shown in FIGS. 8 and 9 can be achieved without a second polarization modifying element 173 by providing a first active area 171 configured to modulate light having the first polarization direction P1 and a second active area 172 configured to modulate light having the second polarization direction P2 (perpendicular to the first polarization direction P1), e.g., by means of two separate appropriately oriented wavefront modulators 170 or by two phase filters in a crossed arrangement.

Figure 10:
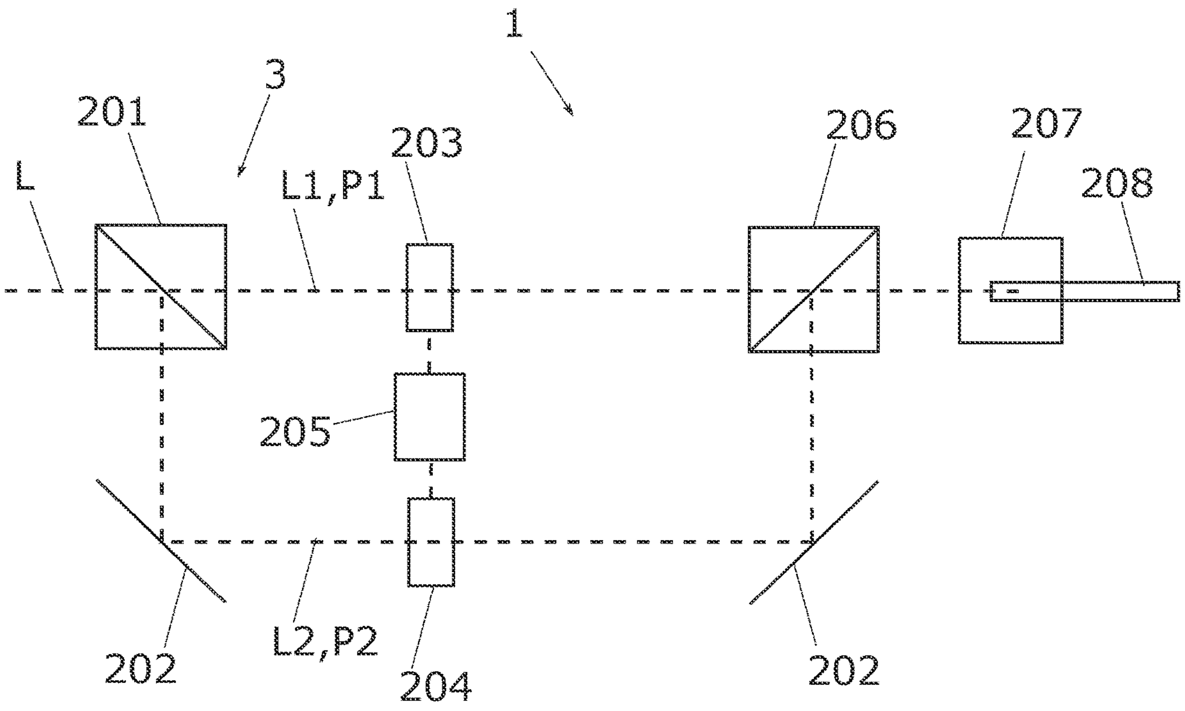

FIG. 10 shows an embodiment of a focusing device 1 with a first polarization switching element 3 comprising a polarizing beam splitter 201, two mirrors 202, a first acousto-optic modulator 203, a second acousto-optic modulator 204, a control device 205, and a polarizing beam combiner 206.

A light beam L is split up into a first light beam L1 having a first polarization direction P1 and a second light beam L2 having a second polarization direction P2 perpendicular to the first polarization direction P1 by the polarizing beam splitter 201. The first light beam L1 is modulated by the first acousto-optic modulator 203, and the second light beam L2 is modulated by the second acousto-optic modulator 204. The first acousto-optic modulator 203 and the second acousto-optic modulator 204 are connected to the control device 205 that is configured to switch between a first state, in which the first light beam L1 is blocked by the first acousto-optic modulator 203, and the intensity of the second light beam is left unaffected by the second acousto-optic modulator 204 and a second state, in which the intensity of the first light beam L1 is left unaffected by the first acousto-optic modulator 203 and the second light beam L2 is blocked by the second acousto-optic modulator 204. The second light beam L2 is guided by mirrors 202 to the polarizing beam combiner 206 in the beam path of the first light beam L1, which combines both light beams L1, L2 into a common beam path. An optional fiber coupler 207 is arranged in the subsequent common beam path. The fiber coupler 207 couples the first light beam L1 or the second light beam into an optical fiber 208.

Figure 11:
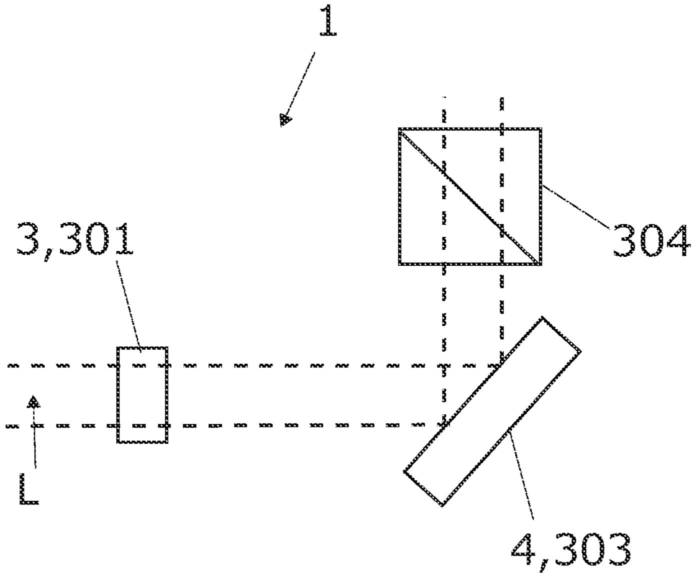

FIG. 11 shows an embodiment of the focusing device 1 comprising a first polarization switching element 3, which is a first electrooptical modulator 301, and a focusing element 4 which is a wavefront modulator 303 in a single-pass configuration. For example, the wavefront modulator 303 may be a liquid crystal-based programmable spatial light modulator which modulates the spatial phase distribution of the light beam L.

The incoming light beam L is linearly polarized in a polarization direction arranged at an angle of 45° with respect to a modulation axis of the first electrooptical modulator 301, such that the first electrooptical modulator 301 introduces a phase shift to a first polarization component of the light beam L but leaves a second polarization component perpendicular to the first polarization component unaffected. The phase shift may be variable depending on a voltage applied to the first electrooptical modulator 301. A principal axis of the wavefront modulator 303 may be oriented parallel to the initial polarization direction and at 45° to the modulation axis of the first electrooptical modulator 301. The wavefront modulator 303 may be configured such that first pixels act as a polarization rotator rotating the polarization direction of the light beam L by 90°, whereas second pixels are inactive, e.g., just reflect or diffract the incoming light.

The focusing device 1 shown in FIG. 11 further comprises a polarizer 304 which is configured to separate the orthogonal polarization components of the light beam L, such that for part of the beam modulated by the first pixels the phase shifted polarization component is transmitted and for the part of the beam impinging on the second pixels, the unshifted polarization component is transmitted. These components may then form a desired intensity distribution by interference when focused by an objective lens.

For example, an annular phase pattern comprising an outer ring (example of a first active area 171) and an inner disk (example of a second active area 172) with a phase difference, e.g. of 180°, may be displayed by the wavefront modulator 303. In this case, the two components will interfere to form a so-called bottle beam (sometimes also termed 3D donut) with a central intensity minimum at the focus. An axial position of the minimum may be adjusted by adjusting the phase shift introduced by the first electrooptical modulator 301, i.e. by adjusting the voltage applied to the first electrooptical modulator 301 gradually or stepwise. In this manner, the arrangement shown in FIG. 11 may be used as a focusing device 1, e.g., in a 3D MINFLUX localization or tracking experiment.

Figure 12:
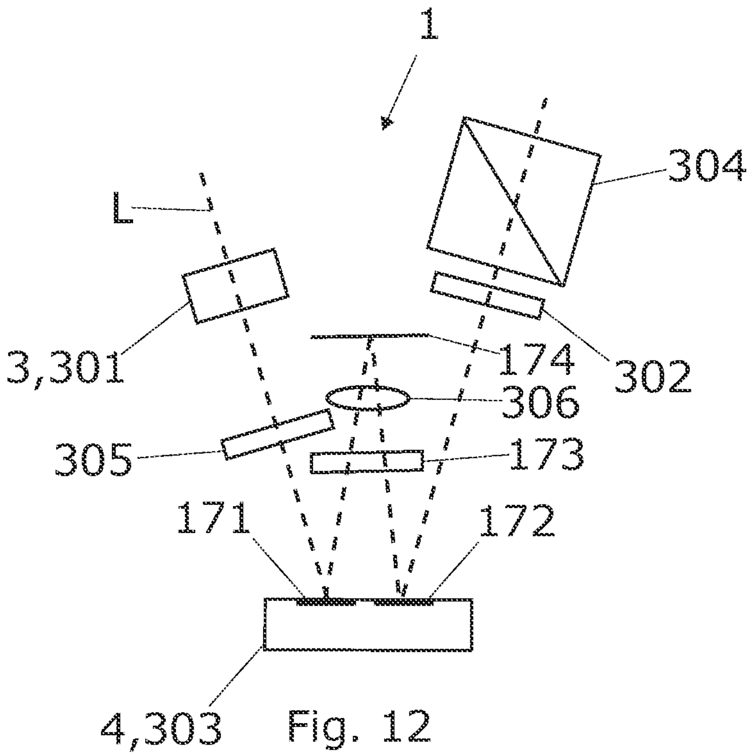

FIG. 12 shows a further embodiment of a focusing device 1 comprising a first polarization switching element 3 which is a first electrooptical modulator 301 with a modulation axis oriented at 45° to an initial polarization direction of the light beam L, a quarter wave plate 305 oriented parallel to the initial polarization direction (i.e., at 45° with respect to the modulation axis of the first electrooptical modulator 301), a wavefront modulator 303 in a double pass configuration acting as a focusing element 4, a halfwave plate 302 oriented at 22.5° with respect to the initial polarization direction of the light beam L, and a polarizer 304.

For example, the wavefront modulator 303 may be a liquid crystal-based programmable spatial light modulator which modulates the spatial phase distribution of the light beam L.

After being reflected or diffracted from a first active area 171 of the wavefront modulator 303 the light beam is imaged onto a second active area 172 of the same wavefront modulator 303 by means of a lens 306 and a reflective element 174 (e.g., a mirror). By passing a second polarization modifying element 173 (e.g., a quarter wave plate) twice, the polarization of the light beam L is rotated by 90°, such that the first active area 171 and the second active area 172 act on orthogonal polarization components of the light beam L. The lens 306 is optional. A similar double pass arrangement with a compact arrangement of a quarter wave plate and a mirror has been described in the prior art. Using the components shown in FIG. 12, when focusing the phase modulated light beam, two different light distributions may be combined interferometrically by displaying the corresponding phase patterns on the first active area 171 and the second active area 172. For example, a bottle beam and a Gaussian focus may be combined to generate an axially shifted bottle beam, which can be used for focusing/axial displacement, e.g. in a 3D MINFLUX method.

By means of the first electrooptical modulator 301 and the quarter wave plate 305, a relative amplitude between two orthogonal polarization components of the light beam may be adjusted depending on the voltage applied to the first electrooptical modulator 301. These components are separately phase modulated by the wavefront modulator 303, rotated by 45° by the half wave plate 302, and finally combined by the polarizer 304, such that they interfere with each other.

In the example, in which a Gaussian focus is combined with a bottle beam to adjust the axial position of the central intensity minimum of the bottle beam, the voltage applied to the first electrooptical modulator 301 may be adjusted gradually or stepwise to adjust the relative amplitude of the polarization components.

LIST OF REFERENCE SIGNS

1 Focusing device
2 Focusing system
3 First polarization switching element
4 Focusing element
41 First telescope lens
42 Second telescope lens
43 Third telescope lens
44 Fourth telescope lens
51 First polarizing beam splitter

52 Second beam splitter
53*a* First mirror
53*b* Second mirror
54 Birefringent element
60 Second polarization switching element
61 First polarization modifying element
71 Third polarizing beam splitter
72 Third polarization switching element
73*a* Third mirror
73*b* Fourth mirror
74 Fourth beam splitter
80 Adjusting device
81 Varifocal lens
90 Polarizer
100 Microscope
101 Mirror
102 Evaluation device
103 Control device
110 Light source
121 Microscope objective lens
130 Detector
131 Pinhole
140 Illumination beam path
150 Beam separator
160 Detection beam path
170 Wavefront modulator
171 First active area
172 Second active area
173 Second polarization modifying element
174 Reflective element
181 Scanning device
182 First lateral deflection device
183 Second lateral deflection device
190 Notch filter
201 Polarizing beam splitter
202 Mirror
203 First acousto-optic modulator
204 Second acousto-optic modulator
205 Control device
206 Polarizing beam combiner
207 Fiber coupler
208 Optical fiber
301 First electrooptic modulator
302 Halfwave plate
303 Wavefront modulator
304 Polarizer
305 Quarter wave plate
306 Lens
A First optical axis
B1 First branch
B2 Second branch
IF Intermediate focus
L Light beam
L1 First light beam
L2 Second light beam
LP1 First light path
LP2 Second light path
M Molecule
MF Main focus
P Particle
P1 First polarization direction
P2 Second polarization direction

The invention claimed is:

1. A focusing device for a microscope comprising a first polarization switching element configured to rotate a polarization of a linearly polarized light beam around a first optical axis from a first polarization direction to a second polarization direction upon receiving a switching signal, and a focusing element configured to axially displace a main focus of the light beam generated by a microscope objective lens between a first axial position and a second axial position dependent on the polarization of the linearly polarized light beam, wherein the focusing device comprises a telescope comprising a first telescope lens and a second telescope lens, wherein the telescope is configured to generate an intermediate focus of the light beam between the first telescope lens and the second telescope lens, wherein the focusing element is configured to shift an axial position of the intermediate focus dependent on the polarization of the linearly polarized light beam, wherein the telescope is the focusing element.

2. The focusing device according to claim 1, wherein the focusing device comprises a first polarizing beam splitter configured to direct the light beam along a first light path and a second light path dependent on the polarization of the linearly polarized light beam, wherein the focusing element is arranged in the first light path or the second light path.

3. The focusing device according to claim 2, wherein the focusing device comprises a second beam splitter configured to join the first light path and the second light path, wherein the second beam splitter is a polarizing beam splitter.

4. The focusing device according to claim 2, wherein the focusing device comprises a second beam splitter configured to join the first light path and the second light path, wherein the second beam splitter is a non-polarizing beam splitter, wherein the focusing device comprises a first polarization modifying element arranged in the first light path or the second light path, wherein the first polarization modifying element is configured to rotate the polarization of the linearly polarized light beam back from the second polarization direction to the first polarization direction.

5. The focusing device according to claim 1, wherein the focusing device comprises a second polarization switching element configured to rotate the polarization of the linearly polarized light beam back from the second polarization direction to the first polarization direction after passing the focusing element.

6. A method for imaging or localizing molecules or particles in a sample using the focusing device according to claim 1, wherein the linearly polarized light beam is generated, the main focus of the light beam is generated in or on a sample, and light emanating from the molecules or particles is detected to image and/or localize the molecules or particles, wherein the polarization of the linearly polarized light beam is rotated around the first optical axis from a first polarization to a second polarization, and the main focus is axially displaced between the first axial position and the second axial position dependent on the orientation of the polarization of the linearly polarized light beam.

7. The method according to claim 6, wherein the method is a MINFLUX localization microscopy method.

8. The focusing device according to claim 1, wherein the focusing device comprises a first polarizing beam splitter configured to direct the light beam along a first light path and a second light path dependent on the orientation of the polarization of the linearly polarized light beam, wherein the focusing device comprises a first focusing element arranged in the first light path and a second focusing element arranged in the second light path, wherein the first focusing element and the second focusing element comprise different focal lengths.

9. A microscope for imaging or localizing molecules or particles in a sample, comprising:

a light source configured to provide a linearly polarized light beam;

a focusing device for a microscope comprising a first polarization switching element configured to rotate a polarization of the linearly polarized light beam around a first optical axis from a first polarization direction to a second polarization direction upon receiving a switching signal, and a focusing element configured to axially displace a main focus of the light beam generated by a microscope objective lens between a first axial position and a second axial position dependent on the polarization of the linearly polarized light beam, wherein the focusing device comprises a telescope comprising a first telescope lens and a second telescope lens, wherein the telescope is configured to generate an intermediate focus of the light beam between the first telescope lens and the second telescope lens, wherein the focusing element is configured to shift an axial position of the intermediate focus dependent on the polarization of the linearly polarized light beam, wherein the telescope is the focusing element;

the microscope objective lens configured to generate the main focus of the light beam in or on the sample; and a detector configured to detect light emanating from the molecules or particles, wherein the focusing device is configured to axially displace the main focus generated by the microscope objective lens between the first axial position and the second axial position.

10. The microscope according to claim 9, wherein the focusing device is arranged in an illumination beam path of the microscope between the light source and a beam separator separating the illumination beam path from a detection beam path, in which the detector is arranged.

11. The microscope according to claim 9, wherein the microscope is configured for MINFLUX localization microscopy.

* * * * *